(12) United States Patent
Schneider et al.

(10) Patent No.: US 7,440,929 B2
(45) Date of Patent: Oct. 21, 2008

(54) MULTIMODAL AUTHORIZATION METHOD, SYSTEM AND DEVICE

(75) Inventors: John K. Schneider, Snyder, NY (US); Fred W. Kiefer, Clarence, NY (US); Leonard Pratt, Lockport, NY (US); James T. Baker, Lockport, NY (US

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 11/420,686

(22) Filed: May 26, 2006

(65) Prior Publication Data

US 2006/0260988 A1 Nov. 23, 2006

Related U.S. Application Data

(63) Continuation-in-part of application No. 11/273,824, filed on Nov. 15, 2005.

(60) Provisional application No. 60/685,429, filed on May 27, 2005, provisional application No. 60/643,853, filed on Jan. 14, 2005.

(51) Int. Cl.
*G07C 9/00* (2006.01)
*G06K 9/00* (2006.01)
*A61B 5/00* (2006.01)

(52) U.S. Cl. .................. 706/15; 382/115; 382/116

(58) Field of Classification Search .................. 706/15; 382/115, 116
See application file for complete search history.

(56) References Cited

U.S. PATENT DOCUMENTS 5,719,950 A * 2/1998 Osten et al. ............... 382/115
2004/0068342 A1 * 4/2004 Bedont et al. .............. 700/182

OTHER PUBLICATIONS

Osadciw et al., "Optimum Fusion Rules Formultimodal Biometric Systems", 2004.*
International Search Report for PCT/US2005/041290, Feb. 28, 2008, Ultra-Scan Corporation.
Written Opinion for PCT/US2005/041290, Feb. 28, 2008, Ultra-Scan Corporation.
Teoh, et al.; Nearest Neighbourhood Classifiers in Biometric Fusion; International Journal of The Computer, the Internet and Management, vol. 12, No. 1, Jan.-Apr. 2004; pp. 23-36.
Neyman, et al.; On the Problem of the most Efficient Tests of Statistical Hypotheses; 1933; pp. 289-337.

* cited by examiner

*Primary Examiner*—David Vincent
*Assistant Examiner*—Nathan H Brown, Jr.
(74) *Attorney, Agent, or Firm*—Hodgson Russ LLP

(57) ABSTRACT

The invention includes methods, systems and devices for authenticating transactions. A method may begin by enrolling at least two biometric specimens to a database. A false acceptance ratio ("FAR") is determined for each of the specimens, and authorization options are identified. A cost value is calculated for at least one of the options to provide a calculated cost value ("CCV"). The CCV may be a function of the FAR(s) of the specimen(s) corresponding to the option. An acceptable cost value range ("ACV range") may be identified, and compared to the CCV. If it is determined that the CCV is in the ACV range, then the option is selected. If the CCV is in the ACV range, then a set of biometric samples is provided (the "sample set"). The sample set is compared to the biometric specimens, and it is determined whether the biometric samples match the biometric specimens. If the biometric samples match the biometric specimens, then the transaction is authorized.

26 Claims, 17 Drawing Sheets

Multimodal biometrically authorized point of sale network in which the modalities are fingerprint, signature, iris, facial imaging and hand geometry Bimodal biometrically authorized point of sale network in which the modalities are fingerprint and signature.

Multimodal biometrically authorized point of sale network in which the modalities are fingerprint, signature, iris, facial imaging and hand geometry Multimodal fusion in a POS application Example PDF for Three Biometrics Joint PDF for System #1 + System #2

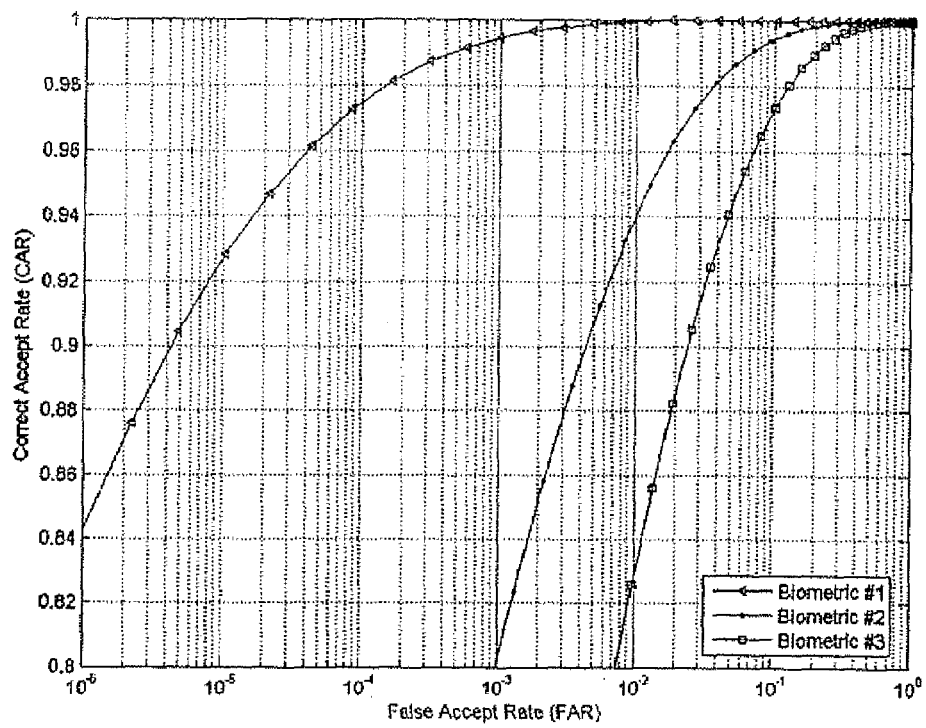
Figure 8 Single System ROC Curves
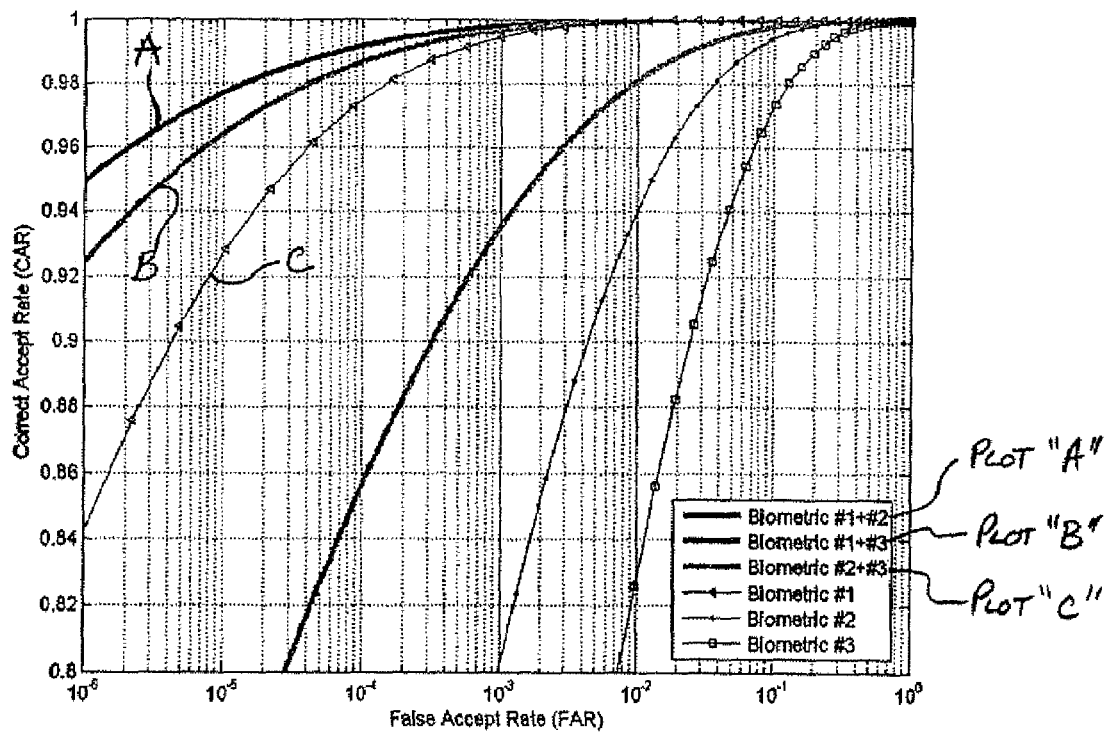
Figure 9 2D Systems Versus Single Systems

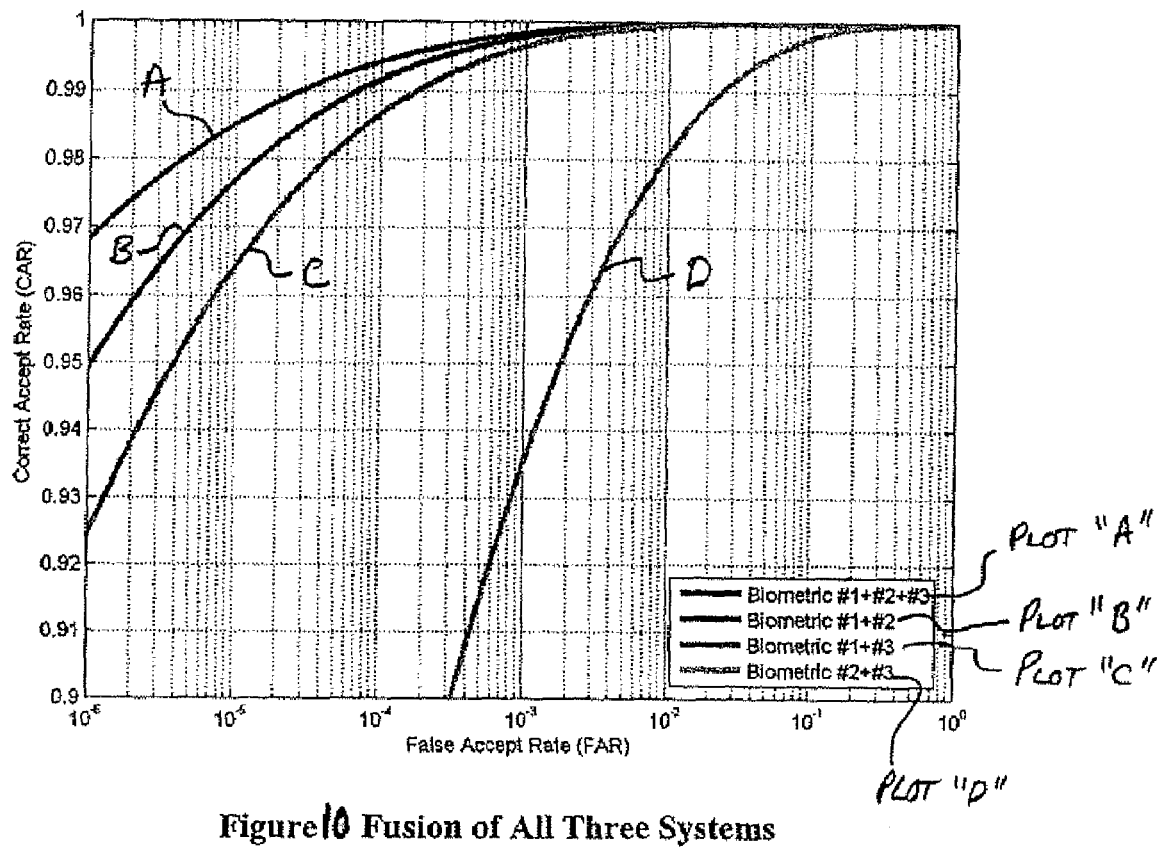
Figure 10 Fusion of All Three Systems

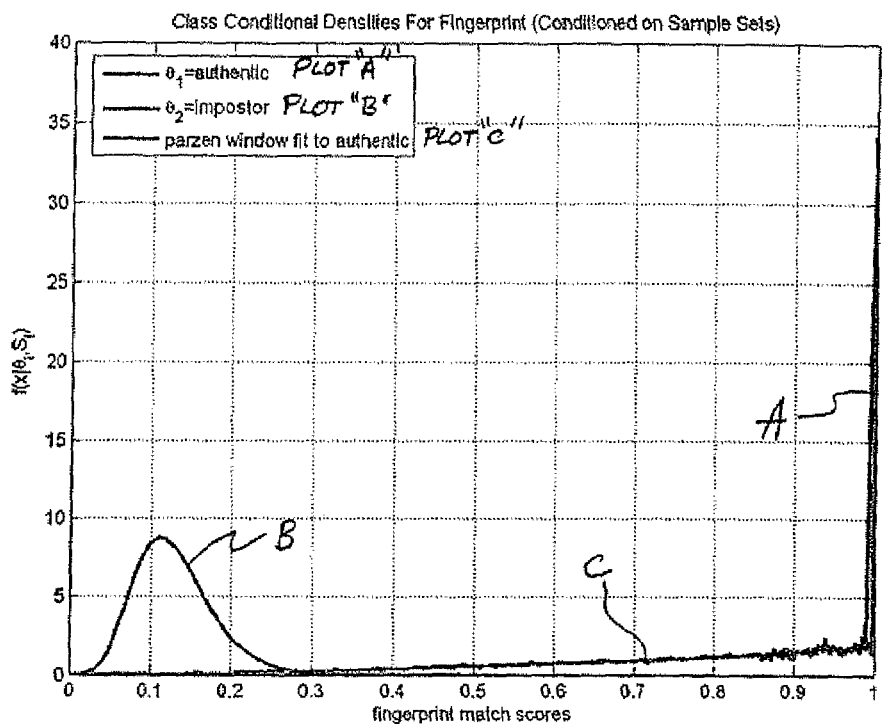
Figure 11 Fingerprint Densities
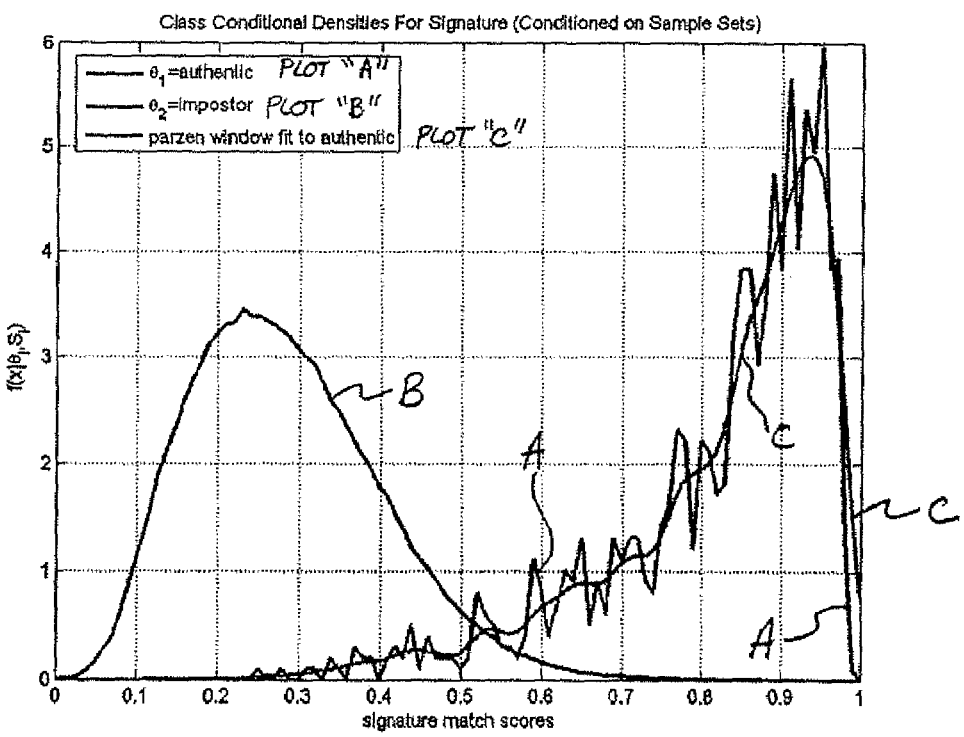
Figure 12 Signature Densities

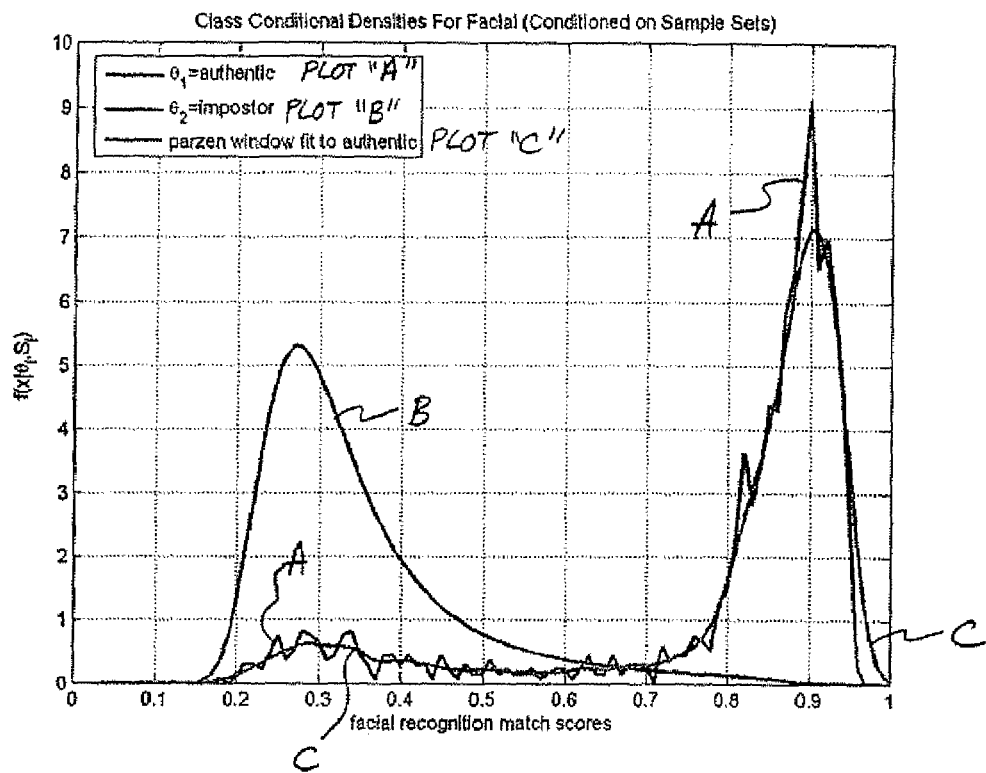
Figure 13 Facial Recognition Densities
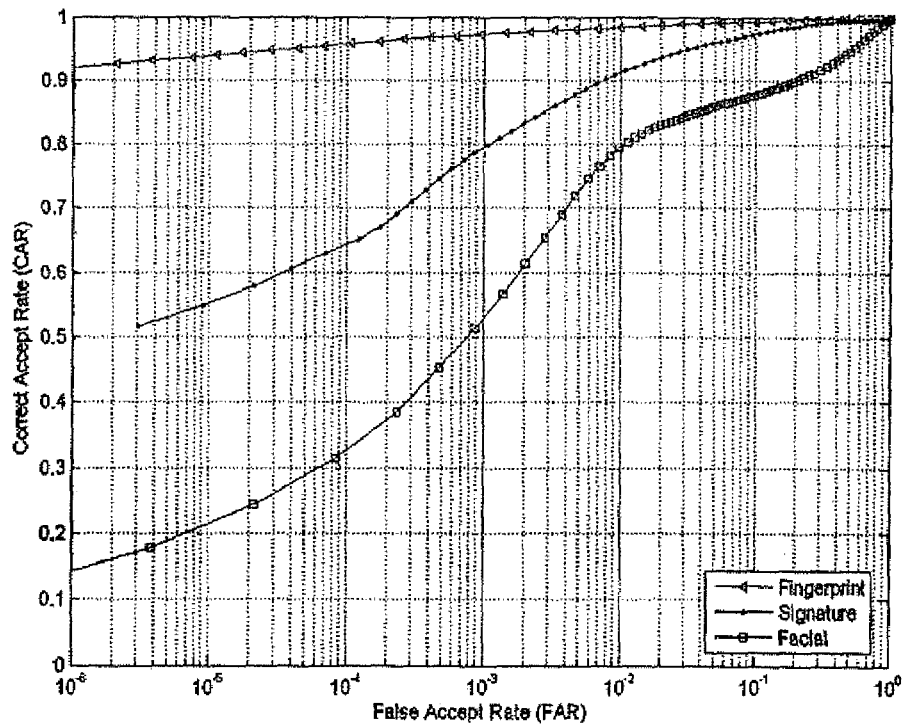
Figure 14 ROC for Individual Biometric Systems

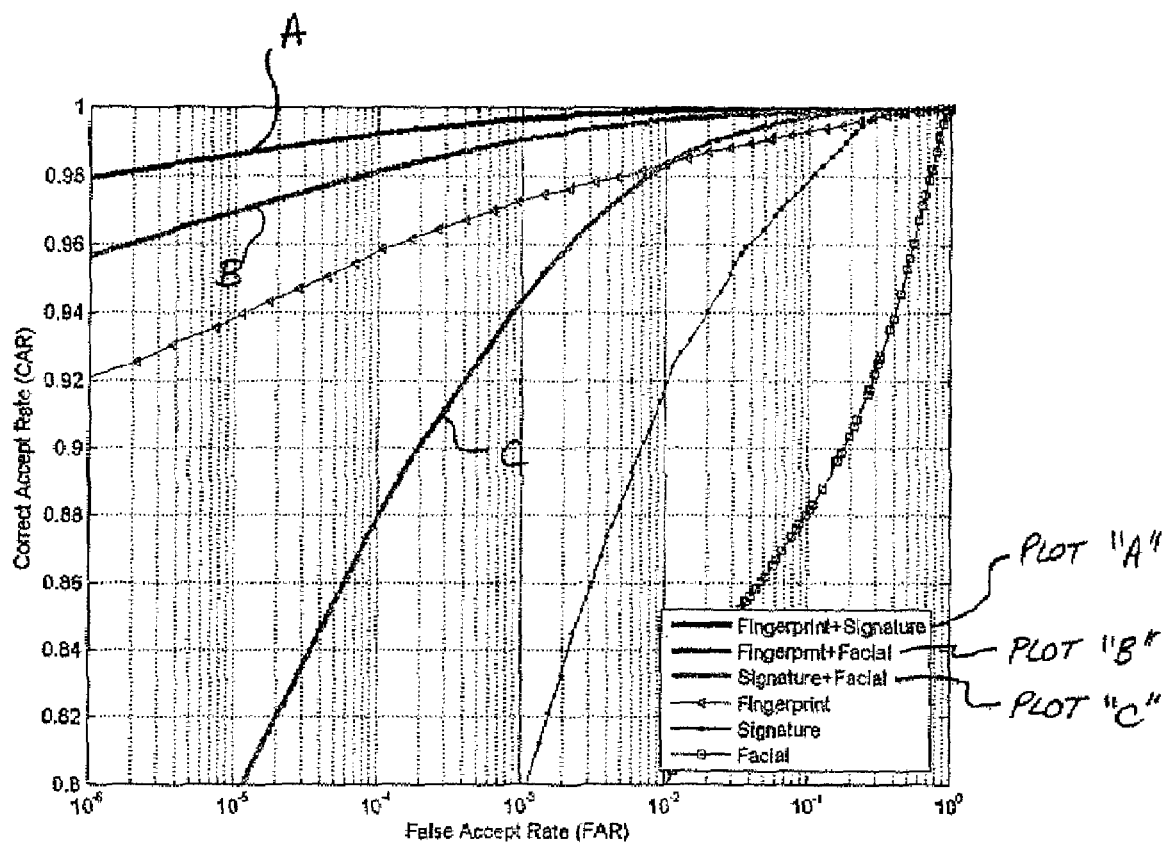
Figure 15 2D ROC - Histogram-Interpolation

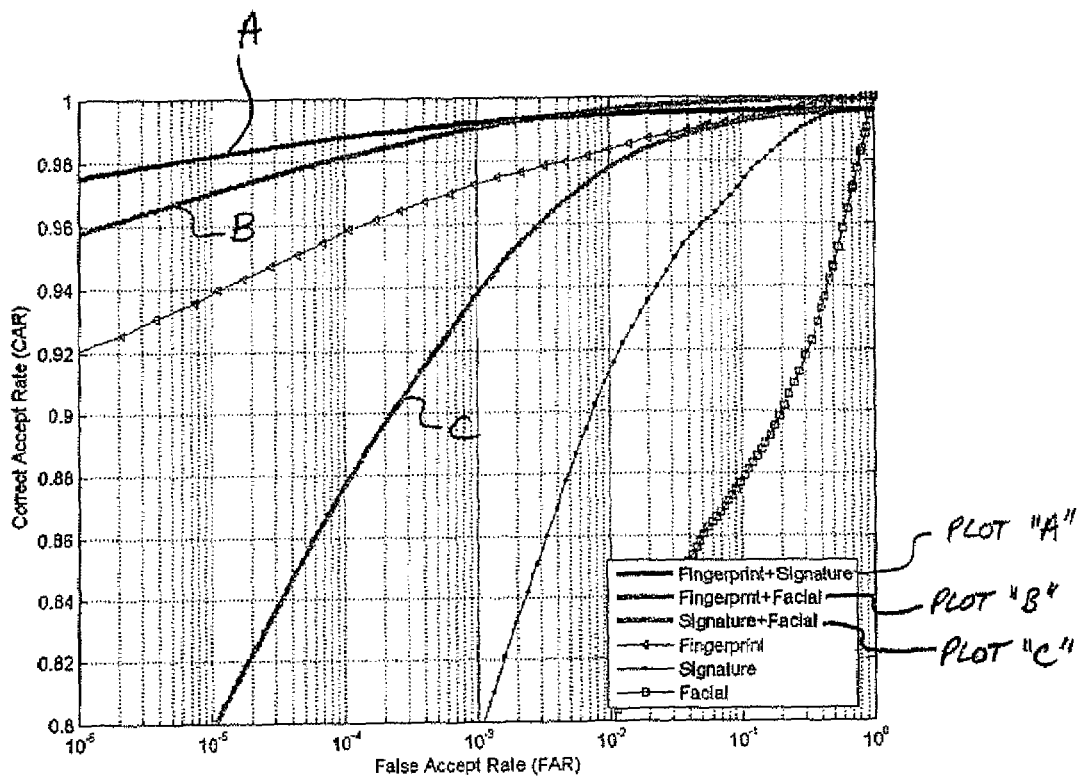
Figure 16 2D ROC - Parzen Window
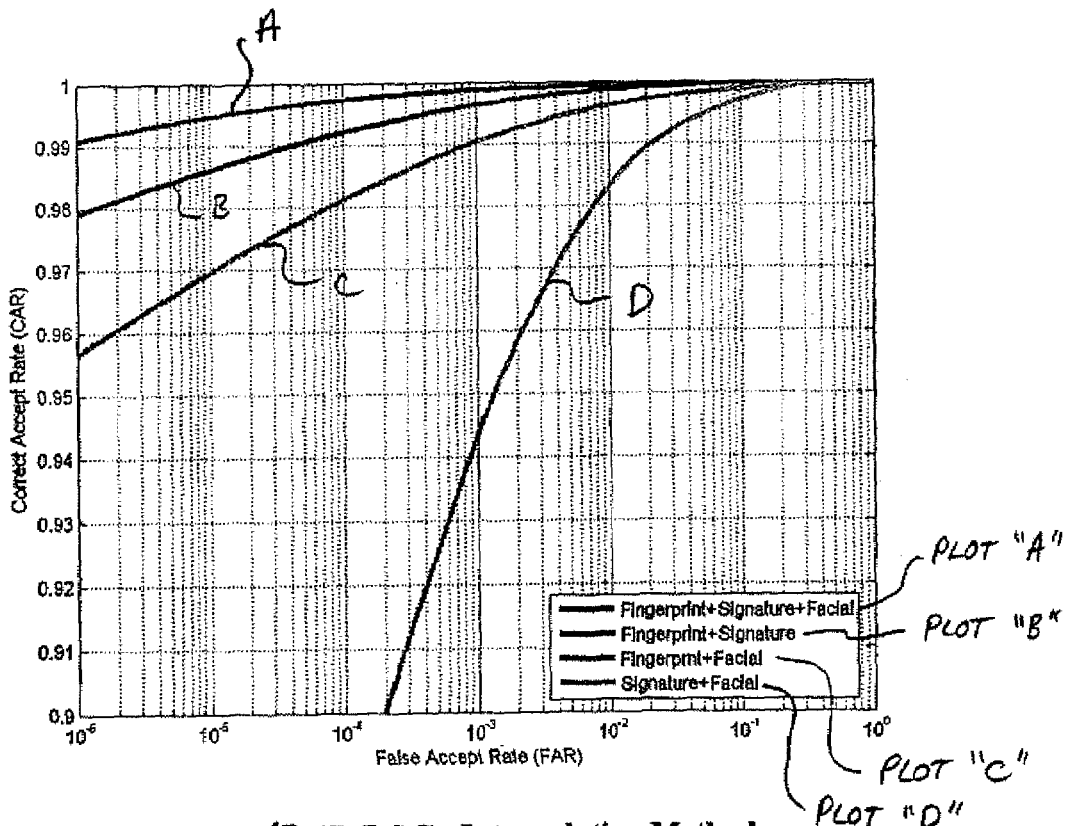
Figure 17 3D ROC - Interpolation Method

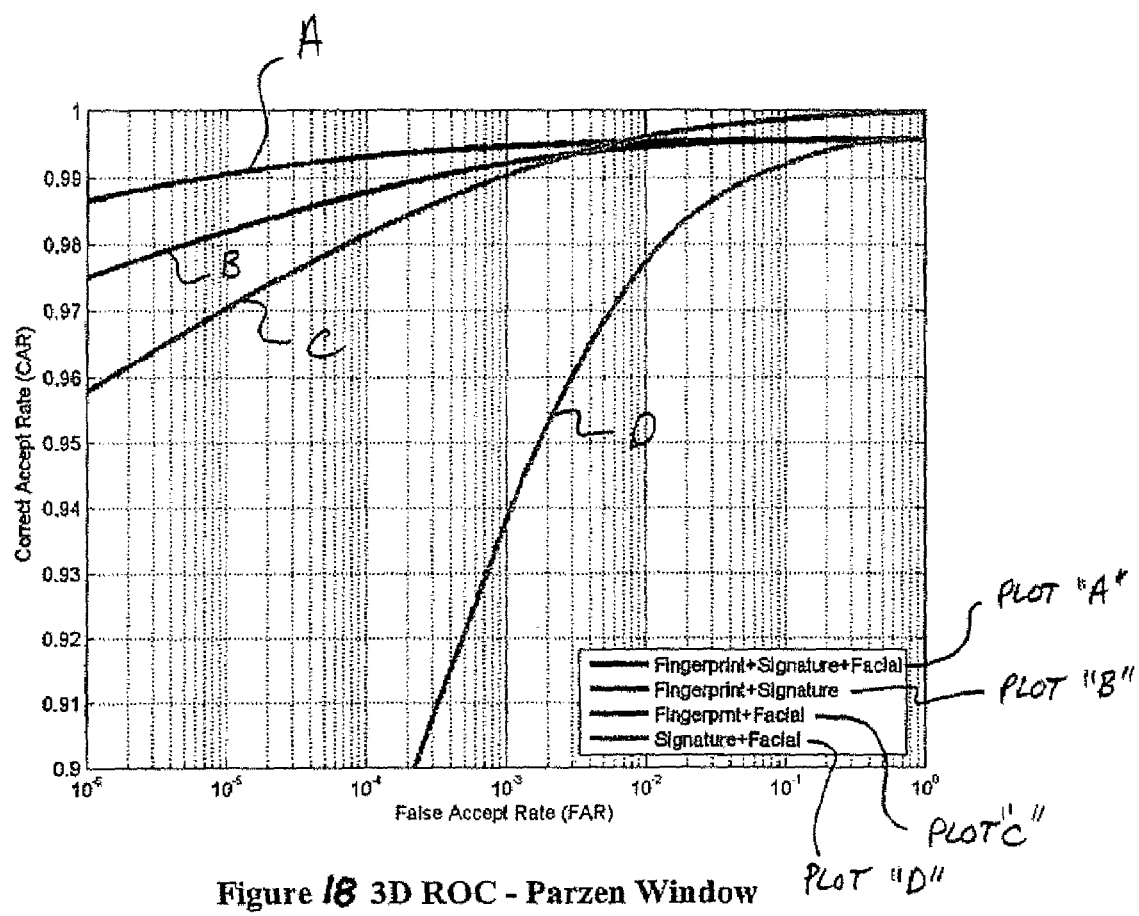
Figure 18 3D ROC - Parzen Window

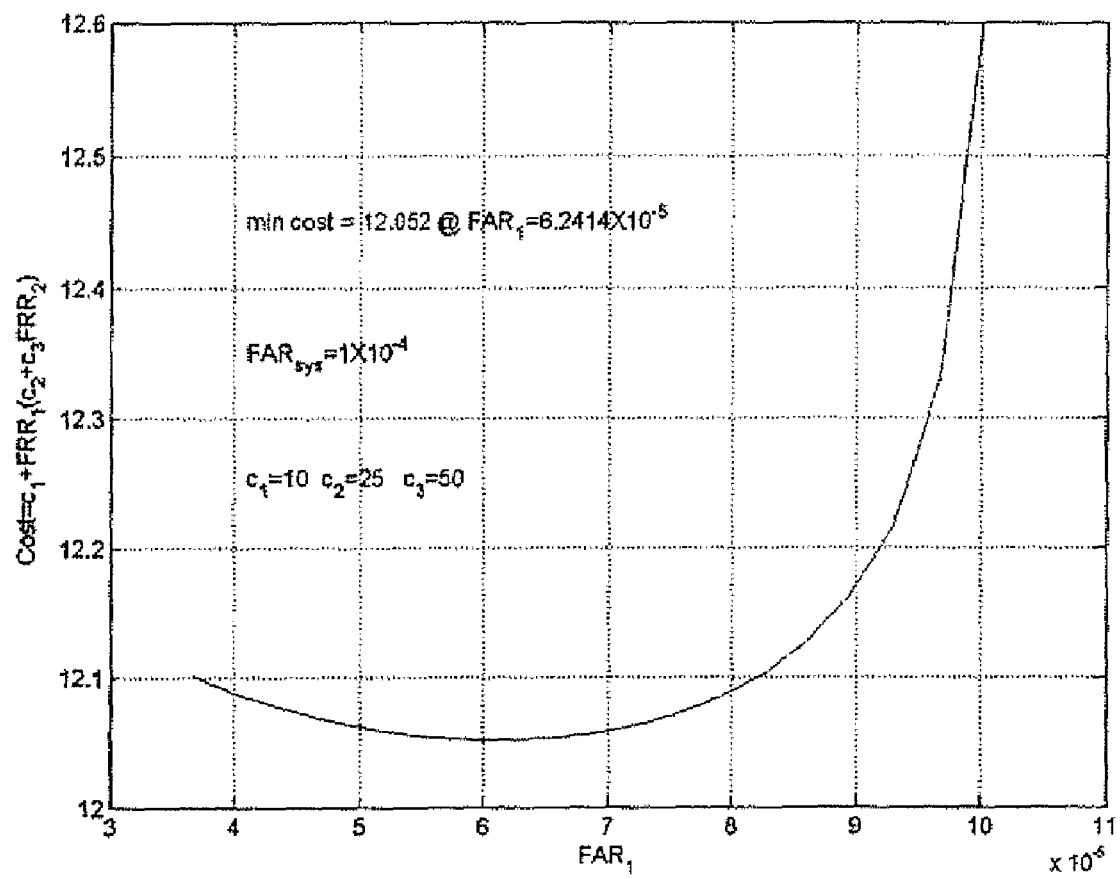
Figure 19 Verification Cost Function

MULTIMODAL AUTHORIZATION METHOD, SYSTEM AND DEVICE

CROSS-REFERENCE TO RELATED APPLICATIONS

This application claims the benefit of priority to U.S. provisional patent application Ser. No. 60/685,429, filed on May 27, 2005. This application is a continuation-in-part and claims the benefit of U.S. patent application Ser. No. 11/273,824 filed on Nov. 15, 2005, which claims priority to U.S. provisional patent application No. 60/643,853, which was filed on Jan. 14, 2005.

FIELD OF THE INVENTION

The present invention relates to authorization systems, such as those that are used to authorize a purchase transaction.

BACKGROUND OF THE INVENTION

Reliable personal authentication is becoming increasingly important. For example, transactions that rely man-made personalized tokens or other identifying instruments to verify the identity of an individual are being targeted by criminals to engage in identity theft. Traditional security measures rely on knowledge-based approaches such as passwords and PINs or on token-based approaches such as swipe cards and photo identification to establish the identity of individuals. Despite being widely used, these are not very secure forms of identification. It is estimated that hundreds of millions of dollars are lost annually in credit card fraud in the United States due to consumer misidentification and identity theft. Biometrics offers a reliable alternative. Biometrics is the method of identifying an individual based on his or her physiological and/or behavioral characteristics. Examples of biometrics include fingerprint, face recognition, hand geometry, voice, iris, and signature verification. Biometrics may be used for immigration, airport, border, and homeland security. Wide scale deployments of biometric applications such as the US-VISIT program are already being done in the United States and elsewhere in the world.

Despite advances in biometric identification systems, several obstacles have hindered their deployment. For example, for every biometric modality there may be some users who have illegible biometrics. For example a recent NIST (National Institute of Standards and Technology) study indicates that approximately 2 to 5% of the population does not have legible fingerprints. Such users would be rejected by a biometric fingerprint identification system during enrollment and verification. Handling such exceptions is time consuming and costly, especially in high volume scenarios such as in retail stores where thousands of transactions may be subject to authentication each day. Using multiple biometrics to authenticate an individual will alleviate this problem; and, using multiple biometrics in a data fusion logic process may achieve a quicker means of acquiring an accurate identification match.

Furthermore, unlike password or PIN based systems, biometric systems inherently yield probabilistic results and are therefore not fully accurate. In effect, a certain percentage of the genuine users will be rejected (false non-match) and a certain percentage of impostors will be accepted (false match) by the system.

SUMMARY OF THE INVENTION

The invention includes a method of authorizing a transaction. In one such method, at least two biometric specimens are enrolled. A first one of the specimens is a first type, and a second one of the specimens is a second type. A false acceptance ratio ("FAR") is determined for each of the specimens. Authorization options are identified, each option requiring a match to one or more of the biometric specimens. A cost value is calculated for at least one of the options to provide a calculated cost value ("CCV"). The CCV may be a function of the FAR(s) of the specimen(s) corresponding to the option.

An acceptable cost value range ("ACV range") may be identified, and compared to the CCV. If it is determined that the CCV is in the ACV range, then the option is selected. If it is determined that the CCV is not in the ACV range, then the option may be discarded for use in authorizing that transaction.

If the CCV is in the ACV range, then a set of biometric samples is provided (the "sample set"). The sample set has biometric samples of the same types as those corresponding to the selected option. The biometric samples are compared to the biometric specimens, and it is determined whether the biometric samples match the biometric specimens. If the biometric samples match the biometric specimens, then the transaction is authorized.

The invention may be embodied as a computer readable memory device or a system which is capable of carrying out methods according to the invention. In one such system, there is (a) a computer capable of executing computer-readable instructions, (b) at least one biometric specimen reader in communication with the computer, (c) at least one biometric sample reader in communication with the computer, (d) a database, and (e) computer-readable instructions provided to the computer for causing the computer to execute certain functions. The instructions may be stored on a memory device and provided from the memory device to the computer. Those functions may include (i) enrolling in the database at least two biometric specimens via one or more of the biometric specimen readers, a first one of the specimens being a first type, and a second one of the specimens being a second type, (ii) determining a false acceptance ratio ("FAR") for each of the specimens, (iii) identifying authorization options, each option requiring a match to one or more of the biometric specimens (iv) calculating a cost value for at least one of the options to provide a calculated cost value ("CCV"), wherein the CCV is a function of the FAR(s) of the specimen(s) corresponding to the option (v) identifying an acceptable cost value range ("ACV range"), (vi) comparing the CCV to the ACV range, (vii) determining whether the CCV is in the ACV range, (viii) selecting the option if the CCV is in the ACV range, (ix) providing a set of biometric sample(s) (the "sample set") via one or more of the biometric sample readers, the sample set having biometric sample(s) of the same type(s) as those corresponding to the selected option (x) comparing the biometric sample(s) to the biometric specimen(s) (xi) determining whether the biometric sample(s) match the biometric specimen(s) (xi) if the biometric sample(s) match the biometric specimen(s), then authorizing the transaction.

The false acceptance ratios may be determined using the following equation $$FAR = P_{Type\,I} = P(x \in R_{Au}\,|\,\text{Im}) = \int_{R_{Au}} f(x\,|\,\text{Im})\,dx.$$

The cost values may be determined using the following equation $$\text{Cost} = c_1 + c_2 FAR_1 + c_3 \prod_{i=1}^{2} FAR_i + \ldots + c_{N+1} \prod_{i=1}^{N} FAR_i.$$

BRIEF DESCRIPTION OF THE DRAWINGS

For a fuller understanding of the nature and objects of the invention, reference should be made to the accompanying drawings and the subsequent description. Briefly, the drawings are:

FIG. 8, which is a plot of the receiver operating curves (ROC) for three biometrics;

FIG. 9, which is a plot of the two-dimensional fusions of the three biometrics taken two at a time versus the single systems;

FIG. 10, which is a plot the fusion of all three biometric systems;

FIG. 11, which is a plot of the scores versus fingerprint densities;

FIG. 12, which is a plot of the scores versus signature densities;

FIG. 13, which is a plot of the scores versus facial recognition densities;

FIG. 14, which is the ROC for the three individual biometric systems;

FIG. 15, which is the two-dimensional ROC—Histogram_interpolations for the three biometrics singly and taken two at a time;

FIG. 16, which is the two-dimensional ROC similar to FIG. 15 but using the Parzen Window method;

FIG. 17, which is the three-dimensional ROC similar to FIG. 15 and interpolation;

FIG. 18, which is the three-dimensional ROC similar to FIG. 17 but using the Parzen Window method;

FIG. 19, which is a cost function for determining the minimum cost given a desired FAR and FRR;

FURTHER DESCRIPTION OF THE INVENTION

Figure 1:
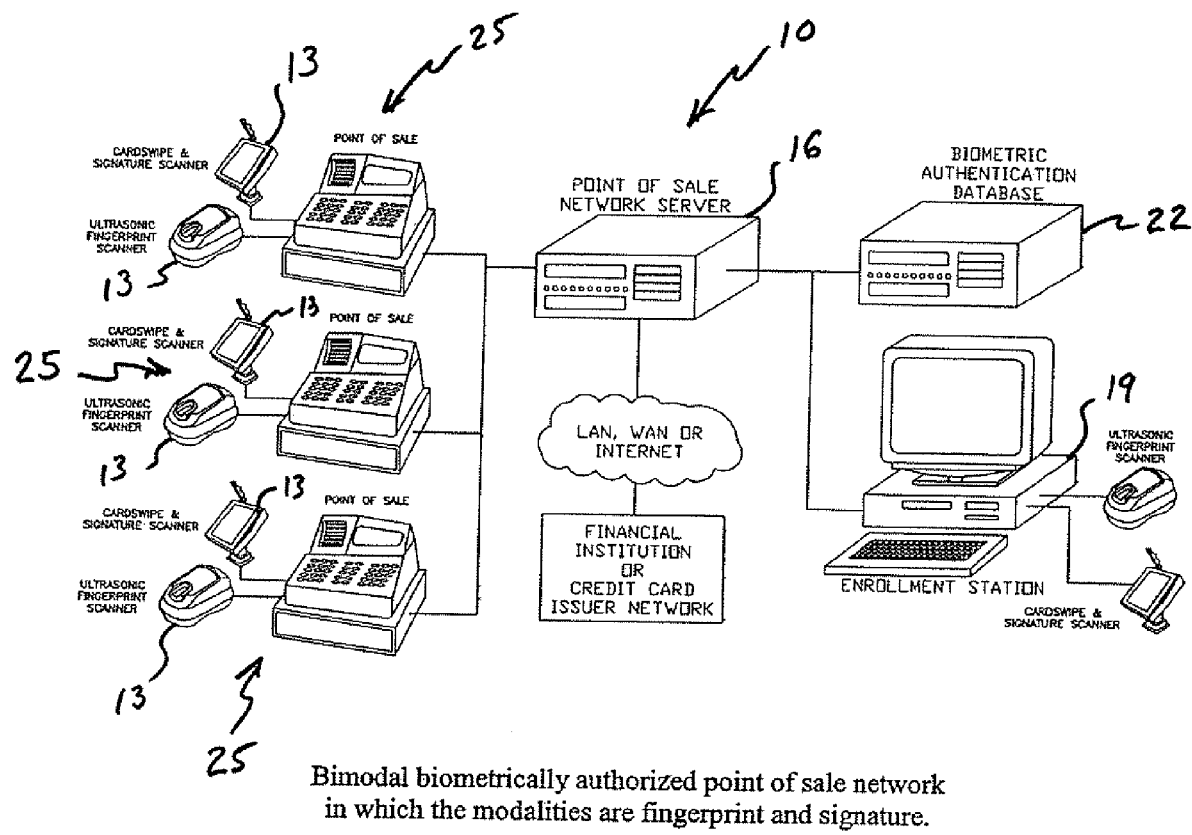
FIG. 1, which is a schematic diagram of a bimodal biometric point-of-sale system according to the invention. This system uses biometric authentication to authorize a purchase/sale transaction that is being validated by the use of fingerprint and signature biometrics.
Figure 2:
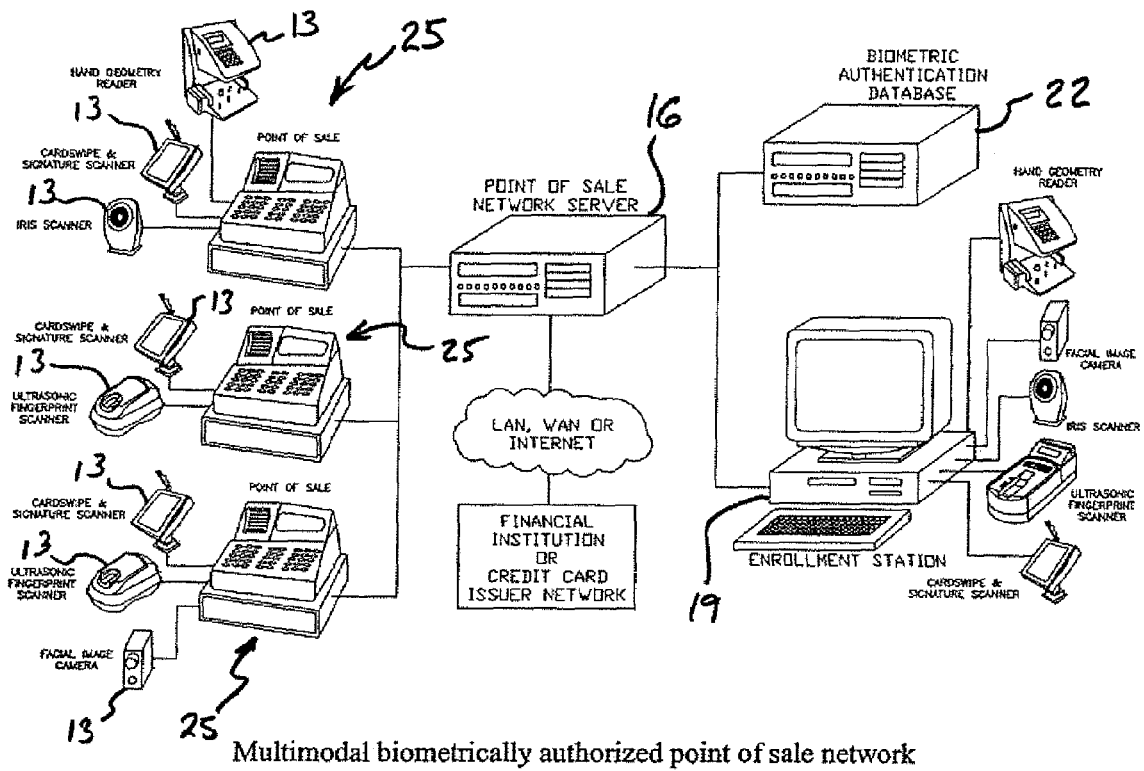
FIG. 2, which is a schematic diagram of another biometric point-of-sale system according to the invention. In this system, it is possible to use several biometric modalities to validate the identification of someone using the system.

FIGS. 1 and 2 illustrate generally systems 10 that may be used to carry out the invention. In these figures there are shown biometric input devices 13, which may be used to provide biometric samples. A network server 16 may provide the samples to a computer 19. The computer 19 may be in communication with a database 22 of biometric specimens, and the computer 19 may be able to determine whether the biometric samples provided at a point-of-sale terminal 25 match biometric specimens stored in the database 22.

Figure 3:
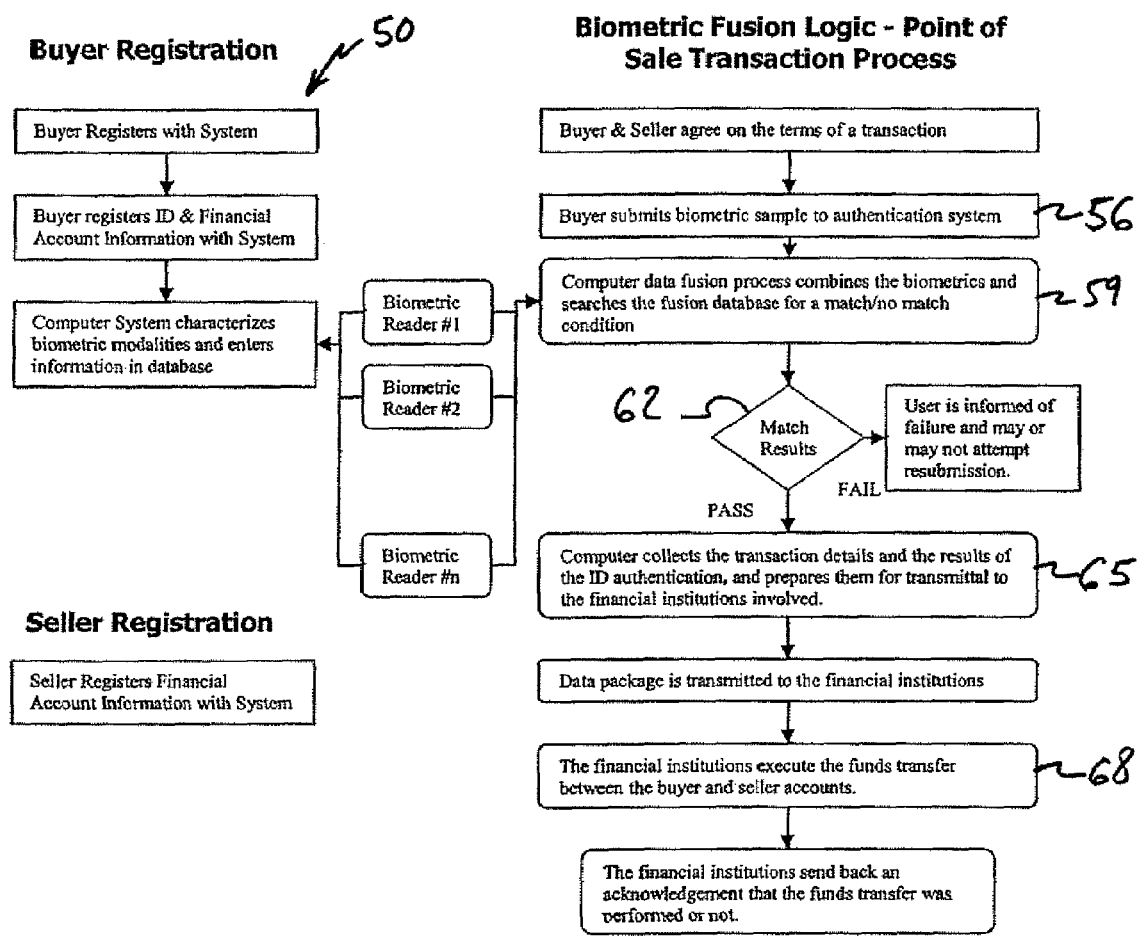
FIG. 3 illustrates a method according to the invention.

FIG. 3 illustrates a generally a method that may be used to carry out the invention. In FIG. 3 a buyer registers 50 biometric specimens using one or more biometric readers. The specimens are provided 53 to in a database for later use. When a buyer desires to purchase goods or services from a seller, the buyer provides 56 biometric samples corresponding to the biometric specimens that were previously stored in the database. The computer then compares 59 the specimens to the samples to determine 62 whether there is a match between the set of samples and the set of specimens. If a match is determined 62, the transaction is authorized 65, and funds may be transferred 68 from the buyer's financial institution to the seller's financial institution.

Figure 4:
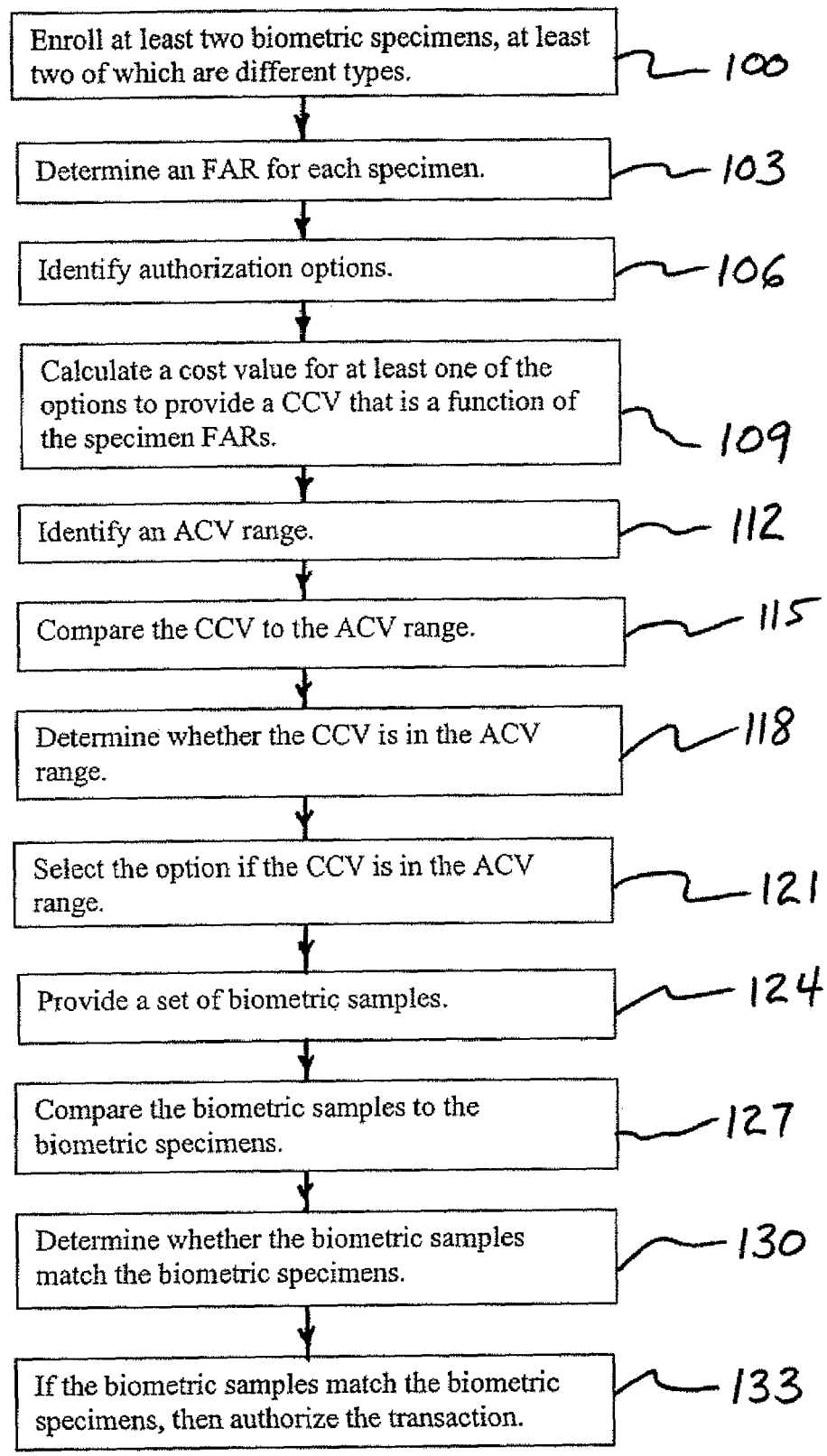
FIG. 4 illustrates a method according to the invention.

FIG. 4 illustrates in more detail how such a transaction may be authorized. Although FIG. 3 illustrates the invention with regard to a purchase/sale transaction, the invention is not limited to such a transaction, and so FIG. 4 illustrates a method according to the invention in general terms. The invention may be implemented as a method executed by an authorization system, such as a facility-access system or a point-of-sale system. The authentication system may be used to determine whether a person should be allowed access to a facility, or whether a financial transaction should be allowed to proceed. For example, the financial transaction may be the purchase of goods or services using a credit account or a debit account maintained by a financial institution such as a bank.

According to the invention, biometric identification may be accomplished using multiple biometric types. For example, the types of biometrics that may be used include fingerprints, facial images, retinal images, iris scans, hand geometry scans, voice prints, signatures, signature gaits, keystroke tempos, blood vessel patterns, palm prints, skin composition spectrums, lip shape, and ear shape.

In one such method or authorizing a transaction, at least two biometric specimens are enrolled 100. A first one of the specimens may be a first type, and a second one of the specimens may be a second type. For example, the specimens may be from different body parts. For example, one of the specimens may be a fingerprint and another of the specimens may be an iris scan. Or, one of the specimens may be a fingerprint from a person's thumb, and one of the specimens may be a fingerprint from the person's index finger. The biometric specimens may be saved in a database for later use. A false acceptance ratio ("FAR") may be determined 103 for each of the specimens in the database. Determining 103 an FAR may be done in a number of ways, but a particular way would be to determine 103 false acceptance ratios using the following equation;

$$FAR = P_{Type\,I} = P(x \in R_{Au} \mid \text{Im}) = \int_{R_{Au}} f(x \mid \text{Im})\,dx.$$

Details corresponding to this equation are given later in this document,

Authorization options may be identified 106. Each option may require a match to one or more of the biometric specimens in order for a transaction to be authorized. For example, if three biometric specimens (S1, S2 and S3) are enrolled 100 in the database, the following authorization options may be identified 106:

Option 1: use S1 by itself to authorize a transaction,
Option 2: use S2 by itself to authorize a transaction,
Option 3: use S1 and S2 together to authorize a transaction,
Option 4: use S2 and S3 together to authorize a transaction,
Option 5: use S1 and S3 together to authorize a transaction, and
Option 6: use S1, S2 and S3 together to authorize a transaction.

It will be noted that the possible options may correspond to an arrangement of all or part of the set of biometric specimens. As such, an authorization option may correspond to a permutation of the set of biometric specimens.

To illustrate the concept, consider that if Option 1 is selected, then in order to authorize a transaction, a person would need to provide a biometric sample of the same type as specimen S1, and the sample would need to match specimen S1. There are many ways to determine matches between specimens and samples, and those will not be detailed herein.

As another example, if Option 4 is selected, then in order to authorize a transaction, a person would need to provide a first biometric sample of the same type as specimen S2, as well as a second biometric sample of the same type as specimen S3. In addition, the first sample would need to match S2 and the second sample would need to match S3.

A cost value may be calculated 109 for at least one of the options to provide a calculated cost value ("CCV"). The CCV may be a function of the specimen FAR or specimen FARs (as the case may be), which correspond to the option. Calculating 109 a CCV may be done in a number of ways, but a particular way would be to calculate the CCV using the following equation:

$$\text{Cost} = c_1 + c_2 FAR_1 + c_3 \prod_{i=1}^{2} FAR_i + \ldots + c_{N+1} \prod_{i=1}^{N} FAR_i.$$

Details corresponding to this equation are given later in this document.

An acceptable cost value range ("ACV range") may be identified 112 and the CCV for the option may be compared 112 to the ACV range. The ACV may be identified based on experience. For example, it may be known from experience that requiring an ACV of a particular value will produce an indication as to whether a match exists between specimens and samples in a reasonable amount of time and with an acceptable number of false acceptances. If so, then a system administrator may identify 112 and provide the ACV range. The CCV may be compared 115 to the ACV range, and a determination may be made 118 as to whether the CCV is within the ACV.

If the CCV is in the ACV range, the option corresponding to the CCV may be selected 121, and a request for a set of biometric samples may be made. Upon receiving biometric samples of the same type required by the selected option the samples may be provided 124 and the specimens corresponding to the selected option may be compared 127 to the samples. A determination 130 may be made as to whether each specimen matches one of the samples. If the specimens and samples are determined 130 to match, then the transaction may be authorized 133.

For example, if the cost values of the six options identified above are:
CV1=1.2
CV2=2.2
CV3=0.3
CV4=0.9
CV5=5.0
CV6=3.4 and if the ACV range is selected to be cost values that are less than 2.1, then Options 1, 3 and 4 would be identified as acceptable because they each have a CCV that is less than the ACV. Options 2, 5 and 6 would be deemed unacceptable because they each have a CCV that is above 2.1. Of those options that are identified as acceptable, one of the options may be selected 121, for example, Option 3 may be selected 121 because it has the lowest cost value. The user would then be prompted to provide samples according to Option 3, that is one sample of the same type as S1 and one sample of the same type as S2. If S1 is a fingerprint and S2 is an iris scan, the user would be prompted to provide a fingerprint sample and an iris scan sample, and these samples would then be provided 121 to a matching process in order to determine 130 whether a match exists between S1 and the fingerprint sample, and also whether a match exists between S2 and the iris scan sample. If a match for the fingerprint and a match for the iris scan are determined 130, then the transaction would be authorized 133. For example, if the transaction is authorized 133, the buyer that supplied the samples would be allowed to purchase goods on credit from a vendor.

Figure 5:
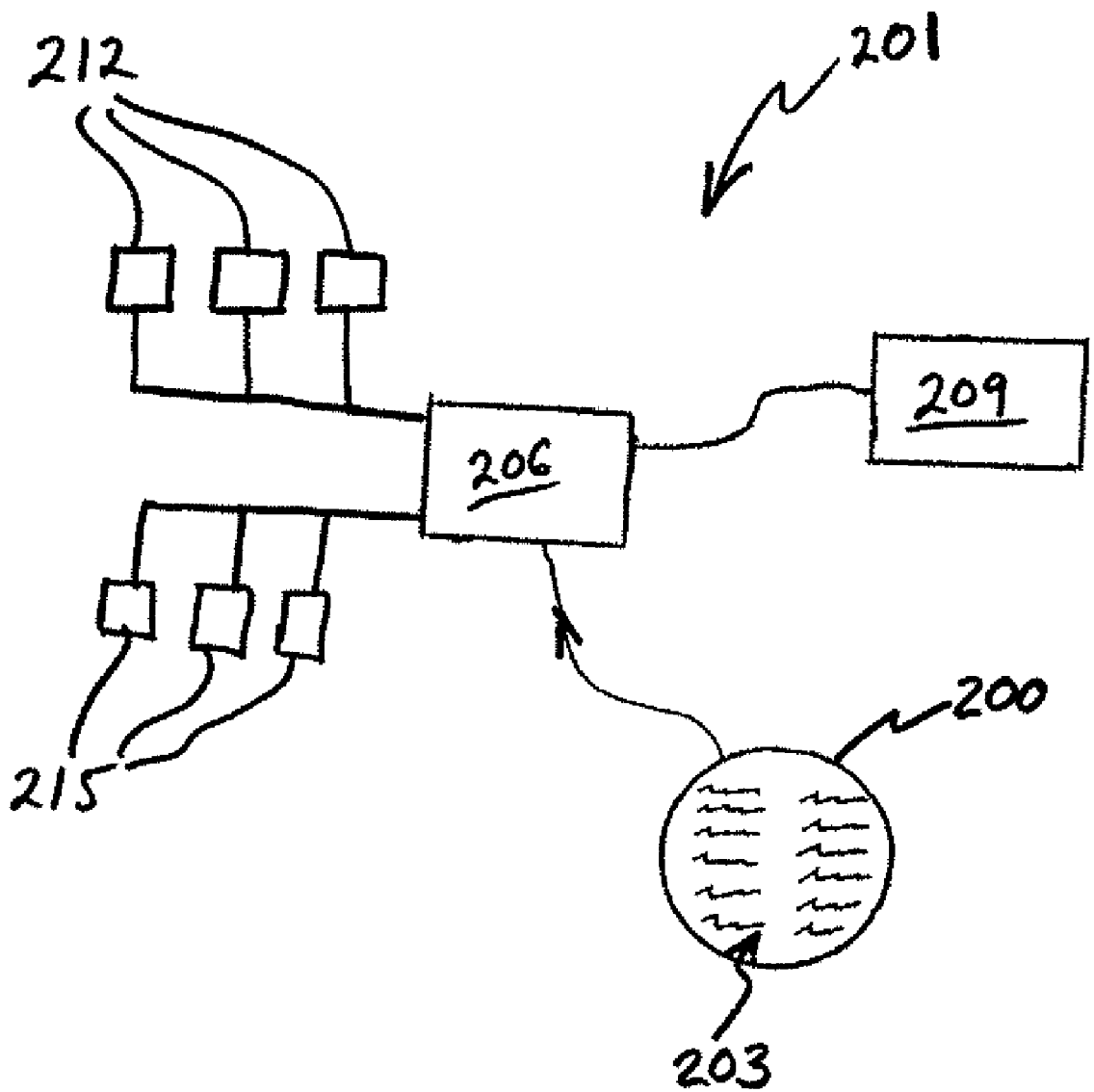
FIG. 5, which illustrates certain aspects of a device and a system according to the invention.

FIG. 5 illustrates a device 200 and a system 201 according to the invention. The invention may be implemented as a computer readable memory device 200 having stored thereon instructions 203 that are executable by a computer 206 that is part of an authorization system 201, which may be used to authorize a transaction. For example, the computer readable memory device 200 may be read-only-memory, such as a compact disc. The memory device 200 may have stored thereon instructions for carrying out a method that is in keeping with the description provided above. For example, the instructions may be executable by the computer 206 to cause the computer 206 to (a) enroll into a database 209 at least two biometric specimens, a first one of the specimens being a first type, and a second one of the specimens being a second type, (b) determine an FAR for each of the specimens, (c) identify authorization options, each option requiring a match to one or more of the biometric specimens, (d) calculate a CCV for at least one of the options, wherein the CCV is a function of the FAR(s) of the specimen(s) corresponding to the option, (e) identify an ACV, (f) compare the CCV to the ACV range, (g) determine whether the CCV is in the ACV range (h) select the option if the CCV is in the ACV range (i) receive and provide a set of biometric sample(s) (the "sample set") corresponding to the specimen type(s) of the selected option (j) compare the biometric sample(s) to the biometric specimen(s), (k) determine whether the biometric sample(s) match the biometric specimen(s), and (l) if the biometric sample(s) match the biometric specimen(s), then authorize the transaction. Biometric specimen readers 212 and biometric sample readers 215 may interface with the computer 206 for the purpose of obtaining biometric specimens and biometric samples, respectively, and providing the specimens and samples to the computer 206. The equations for FAR and CCV identified above may be used in the instructions to the computer 206.

It should be noted that the invention may be used to provide tokened or tokenless authorization of commercial transactions between a buyer and seller using a computer network system and multiple biometrics. Such a system may or may not also include a token of some type, such as a credit card, driver's license, identification instrument or the like. Such a system may also include a PIN or other indexing device to speed the authentication process.

Having identified two equations that may be used in the invention, further details of those equations are now provided. The FAR and CCV equations are part of a larger discussion about biometric fusion, which is the study of how two or more biometric types (sometimes referred to as modalities) may be used. Algorithms may be used to combine information from two or more biometric modalities. The combined information may allow for more reliable and more accurate identification of an individual than is possible with systems based on a single biometric modality. The combination of information from more than one biometric modality is sometimes referred to herein as "biometric fusion".

Reliable personal authentication is becoming increasingly important. The ability to accurately and quickly identify an individual is important to immigration, law enforcement, computer use, and financial transactions. Traditional security measures rely on knowledge-based approaches, such as passwords and personal identification numbers ("PINs"), or on token-based approaches, such as swipe cards and photo identification, to establish the identity of an individual. Despite being widely used, these are not very secure forms of identification. For example, it is estimated that hundreds of millions of dollars are lost annually in credit card fraud in the United States due to consumer misidentification.

Biometrics offers a reliable alternative for identifying an individual. Biometrics is the method of identifying an individual based on his or her physiological and behavioral characteristics. Common biometric modalities include fingerprint, face recognition, hand geometry, voice, iris and signature verification, The Federal government will be a leading consumer of biometric applications deployed primarily for immigration, airport, border, and homeland security. Wide scale deployments of biometric applications such as the US-VISIT program are already being done in the United States and else where in the world.

Despite advances in biometric identification systems, several obstacles have hindered their deployment. Every biometric modality has some users who have illegible biometrics. For example a recent NIST (National Institute of Standards and Technology) study indicates that nearly 2 to 5% of the population does not have legible fingerprints. Such users would be rejected by a biometric fingerprint identification system during enrollment and verification. Handling such exceptions is time consuming and costly, especially in high volume scenarios such as an airport. Using multiple biometrics to authenticate an individual may alleviate this problem.

Furthermore, unlike password or PIN based systems, biometric systems inherently yield probabilistic results and are therefore not fully accurate. In effect a certain percentage of the genuine users will be rejected (false non-match) and a certain percentage of impostors will be accepted (false match) by existing biometric systems. High security applications require very low probability of false matches. For example, while authenticating immigrants and international passengers at airports, even a few false acceptances can pose a severe breach of national security. On the other hand false non matches lead to user inconvenience and congestion.

Existing systems achieve low false acceptance probabilities (also known as False Acceptance Rate or "FAR") only at the expense of higher false non-matching probabilities (also known as False-Rejection-Rate or "FRR"). It has been shown that multiple modalities can reduce FAR and FRR simultaneously. Furthermore, threats to biometric systems such as replay attacks, spoofing and other subversive methods are difficult to achieve simultaneously for multiple biometrics, thereby making multimodal biometric systems more secure than single modal biometric systems.

Systematic research in the area of combining biometric modalities is nascent and sparse. Over the years there have been many attempts at combining modalities and many methods have been investigated, including "Logical And", "Logical Or", "Product Rule", "Sum Rule", "Max Rule", "Min Rule", "Median Rule", "Majority Vote", "Bayes' Decision", and "Neyman-Pearson Test". None of these methods has proved to provide low FAR and FRR that is needed for modern security applications.

The need to address the challenges posed by applications using large biometric databases is urgent. The US-VISIT program uses biometric systems to enforce border and homeland security. Governments around the world are adopting biometric authentication to implement National identification and voter registration systems. The Federal Bureau of Investigation maintains national criminal and civilian biometric databases for law enforcement.

Although large-scale databases are increasingly being used, the research community's focus is on the accuracy of small databases, while neglecting the scalability and speed issues important to large database applications. Each of the example applications mentioned above require databases with a potential size in the tens of millions of biometric records. In such applications, response time, search and retrieval efficiency also become important in addition to accuracy.

As noted above, the invention may be used to determine whether a set of biometrics is acceptable for making a decision about whether a transaction should be authorized. The data set may be comprised of information pieces about objects, such as people. Each object may have at least two types of information pieces, that is to say the data set may have at least two modalities. For example, each object represented in the database may by represented by two or more biometric samples, for example, a fingerprint sample and an iris scan sample. A first probability partition array ("$Pm(i,j)$") may be provided. The $Pm(i,j)$ may be comprised of probability values for information pieces in the data set, each probability value in the $Pm(i,j)$ corresponding to the probability of an authentic match. $Pm(i,j)$ may be similar to a Neyman-Pearson Lemma probability partition array. A second probability partition array ("$Pfm(i,j)$") may be provided, the $Pm(i,j)$ being comprised of probability values for information pieces in the data set, each probability value in the $Pfm(i,j)$ corresponding to the probability of a false match. $Pfm(i,j)$ may be similar to a Neyman-Pearson Lemma probability partition array.

A method according to the invention may identify a no-match zone. For example, the no-match zone may be identified by identifying a first index set ("A"), the indices in set A being the $(i,j)$ indices that have values in both $Pfm(i,j)$ and $Pm(i,j)$. A second index set ("$Z\infty$") may be identified, the indices of Z∞ being the (i,j) indices in set A where both Pfm(i,j) is larger than zero and Pm(i,j) is equal to zero. $FAR_{Z\infty}$ may be determined, where $FAR_{Z\infty}=1-\Sigma_{(i,j)\in Z_\infty}P_{fm}(i,j)$. FAR $Z_\infty$ may be compared to a desired false-acceptance-rate ("FAR"), and if $FAR_{Z\infty}$ is greater than the desired false-acceptance-rate, than the data set may be rejected for failing to provide an acceptable false-acceptance-rate. If $FAR_{Z\infty}$ is less than or equal to the desired false-acceptance-rate, then the data set may be accepted, if false-rejection-rate is not important.

If false-rejection-rate is important, further steps may be executed to determine whether the data set should be rejected. The method may further include identifying a third index set ZM∞, the indices of ZM∞ being the (i,j) indices in Z∞ plus those indices where both Pfm(i,j) and Pm(i,j) are equal to zero. A fourth index set ("C") may be identified, the indices of C being the (i,j) indices that are in A but not ZM∞. The indices of C may be arranged such that $$\frac{P_{fm}(i,j)_k}{P_m(i,j)_k} >= \frac{P_{fm}(i,j)_{k+1}}{P_m(i,j)_{k+1}}$$

to provide an arranged C index. A fifth index set ("Cn") may be identified. The indices of Cn may be the first N (i,j) indices of the arranged C index, where N is a number for which the following is true: $FAR_{Z_\infty\cup C_N}=1-\Sigma_{(i,j)\in Z_\infty}P_{fm}(i,j)-\Sigma_{(i,j)\in C_N}P_{fm}(i,j)\leq FAR$. The FRR may be determined, where $FRR=\Sigma_{(i,j)\in C_N}P_m(i,j)$, and compared to a desired false-rejection-rate. If FRR is greater than the desired false-rejection-rate, then the data set may be rejected, even though $FAR_{Z\infty}$ is less than or equal to the desired false-acceptance-rate. Otherwise, the data set may be accepted.

In another method according to the invention, the false-rejection-rate calculations and comparisons may be executed before the false-acceptance-rate calculations and comparisons. In such a method, a first index set ("A") may be identified, the indices in A being the (i,j) indices that have values in both Pfm(i,j) and Pm(i,j). A second index set ("Z∞") may be identified, the indices of Z∞ being the (i,j) indices of A where Pm(i,j) is equal to zero. A third index set ("C") may be identified, the indices of C being the (i,j) indices that are in A but not Z∞. The indices of C may be arranged such that $$\frac{P_{fm}(i,j)_k}{P_m(i,j)_k} >= \frac{P_{fm}(i,j)_{k+1}}{P_m(i,j)_{k+1}}$$

to provide an arranged C index, and a fourth index set ("Cn") may be identified. The indices of Cn may be the first N (i,j) indices of the arranged C index, where N is a number for which the following is true: $FAR_{Z_\infty\cup C_N}=1-\Sigma_{(i,j)\in Z_\infty}P_{fm}(i,j)-\Sigma_{(i,j)\in C_N}P_{fm}(i,j)\leq FAR$. The ERR may be determined, where $FRR=\Sigma_{(i,j)\in C_N}P_m(i,j)$, and compared to a desired false-rejection-rate. If the FRR is greater than the desired false-rejection-rate, then the data set may be rejected. If the FRR is less than or equal to the desired false-rejection-rate, then the data set may be accepted, if false-acceptance-rate is not important. If false-acceptance-rate is important, then the $FAR_{Z\infty}$, may be determined, where $FAR_{Z\infty}=1-\Sigma_{(i,j)\in Z_\infty}P_{fm}(i,j)$. The $FAR_{Z\infty}$ may be compared to a desired false-acceptance-rate, and if $FAR_{Z\infty}$ is greater than the desired false-acceptance-rate, then the data set may be rejected even though FRR is less than or equal to the desired false-rejection-rate. Otherwise, the data set may be accepted.

The invention may also be embodied as a computer readable memory device for executing any of the methods described above.

Preliminary Considerations: To facilitate discussion of the invention it may be beneficial to establish some terminology and a mathematical framework. Biometric fusion may be viewed as an endeavor in statistical decision theory [1] [2]; namely, the testing of simple hypotheses. This disclosure uses the term simple hypothesis as used in standard statistical theory: the parameter of the hypothesis is stated exactly. The hypotheses that a biometric score "is authentic" or "is from an impostor" are both simple hypotheses.

In a match attempt, the N-scores reported from N<∞ biometrics is called the test observation. The test observation, x∈S, where $S \subset R^N$ (Euclidean N-space) is the score sample space, is a vector function of a random variable X from which is observed a random sample$(X_1, X_2, \ldots, X_N)$. The distribution of scores is provided by the joint class-conditional probability density function ("pdf"):

$$f(x|\theta)=f(x_1, x_2, \ldots, x_N|\theta) \qquad (1)$$

where θ equals either Au to denote the distribution of authentic scores or Im to denote the distribution of impostor scores. So, if θ=Au, Equation (1) is the pdf for authentic distribution of scores and if θ=Im it is the pdf for the impostor distribution. It is assumed that $f(x|\theta)=f(x_1,x_2,\ldots,x_N|\theta)>0$ on S.

Given a test observation, the following two simple statistical hypotheses are observed: The null hypothesis, $H_0$, states that a test observation is an impostor; the alternate hypothesis, $H_1$, states that a test observation is an authentic match. Because there are only two choices, the fusion logic will partition S into two disjoint sets: $R_{Au} \subset S$ and $R_{Im} \subset S$, where $R_{Au} \cap R_{Im}=\emptyset$ and $R_{Au} \cup R_{Im}=S$. Denoting the compliment of a set A by $A^C$, so that $R_{Au}{}^C=R_{Im}$ and $R_{Im}{}^C=R_{Au}$.

The decision logic is to accept $H_1$ (declare a match) if a test observation, x, belongs to $R_{Au}$ or to accept $H_0$ (declare no match and hence reject $H_1$) if x belongs to $R_{Im}$. Each hypothesis is associated with an error type: A Type I error occurs when $H_0$ is rejected (accept $H_1$) when $H_0$ is true; this is a false accept (FA); and a Type II error occurs when $H_1$ is rejected (accept $H_0$) when $H_1$ is true; this is a false reject (FR). Thus denoted, respectively, the probability of making a Type I or a Type II error follows:

$$FAR = P_{Type\,I} = P(x \in R_{Au} | Im) = \int_{R_{Au}} f(x|Im)\,dx \qquad (2)$$

$$FRR = P_{Type\,II} = P(x \in R_{Im} | Au) = \int_{R_{Im}} f(x|Au)\,dx \qquad (3)$$

So, to compute the false-acceptance-rate (FAR), the impostor score's pdf is integrated over the region which would declare a match (Equation 2). The false-rejection-rate (FRR) is computed by integrating the pdf for the authentic scores over the region in which an impostor (Equation 3) is declared. The correct-acceptance-rate (CAR) is 1−FRR.

The class-conditional pdf for each individual biometric, the marginal pdf, is assumed to have finite support; that is, the match scores produced by the $i^{th}$ biometric belong to a closed interval of the real line, $\gamma_i=[\alpha_i, \omega_i]$, where $-\infty<\alpha_i<\omega_i<+\infty$. Two observations are made. First, the sample space, S, is the Cartesian product of these intervals, i.e., $S=\gamma_1\times\gamma_2\times\ldots\times\gamma_N$. Secondly, the marginal pdf, which we will often reference, for any of the individual biometrics can be written in terms of the joint pdf:

$$f_i(x_i | \theta) = \int_{\gamma_j \forall j \neq i} \cdots \int f(x | \theta) dx \tag{4}$$

For the purposes of simplicity the following definitions are stated:

Definition 1: In a test of simple hypothesis, the correct-acceptance-rate, CAR=1−FRR is known as the power of the test.

Definition 2: For a fixed FAR, the test of simple $H_0$ versus simple $H_1$ that has the largest CAR is called most powerful.

Definition 3: Verification is a one-to-one template comparison to authenticate a person's identity (the person claims their identity).

Definition 4: Identification is a one-to-many template comparison to recognize an individual (identification attempts to establish a person's identity without the person having to claim an identity), The receiver operation characteristics (ROC) curve is a plot of CAR versus FAR, an example of which is shown in FIG. 8. Because the ROC shows performance for all possible specifications of FAR, as can be seen in the FIG. 8, it is an excellent tool for comparing performance of competing systems, and we use it throughout our analyses.

Fusion and Decision Methods: Because different applications have different requirements for error rates, there is an interest in having a fusion scheme that has the flexibility to allow for the specification of a Type-I error yet have a theoretical basis for providing the most powerful test, as defined in Definition 2. Furthermore, it would be beneficial if the fusion scheme could handle the general problem, so there are no restrictions on the underlying statistics. That is to say that:

Biometrics may or may not be statistically independent of each other,

The class conditional pdf can be multi-modal (have local maximums) or have no modes.

The underlying pdf is assumed to be nonparametric (no set of parameters define its shape, such as the mean and standard deviation for a Gaussian distribution).

A number of combination strategies were examined, all of which are listed by Jain [4] on page 243. Most of the schemes, such as "Demptster-Shafer" and "fuzzy integrals" involve training. These were rejected mostly because of the difficulty in analyzing and controlling their performance mechanisms in order to obtain optimal performance. Additionally, there was an interest in not basing the fission logic on empirical results. Strategies such as SUM, MEAN, MEDIAN, PRODUCT, MIN, MAX were likewise rejected because they assume independence between biometric features.

When combining two biometrics using a Boolean "AND" or "OR" it is easily shown to be suboptimal when the decision to accept or reject $H_1$ is based on fixed score thresholds. However, the "AND" and the "OR" are the basic building blocks of verification (OR) and identification (AND). Since we are focused on fixed score thresholds, making an optimal decision to accept or reject $H_1$ depends on the structure of: $R_{Au} \subset S$ and $R_{Im} \subset S$, and simple thresholds almost always form suboptimal partitions.

If one accepts that accuracy dominates the decision making process and cost dominates the combination strategy, certain conclusions may be drawn. Consider a two-biometric verification system for which a fixed FAR has been specified. In that system, a person's identity is authenticated if $H_1$ is accepted by the first biometric OR if accepted by the second biometric. If $H_1$ is rejected by the first biometric AND the second biometric, then manual intervention is required. If a cost is associated with each stage of the verification process, a cost function can be formulated. It is a reasonable assumption to assume that the fewer people that filter down from the first biometric sensor to the second to the manual check, the cheaper the system.

Suppose a fixed threshold is used as the decision making process to accept or reject $H_1$ at each sensor and solve for thresholds that minimize the cost function. It will obtain settings that minimize cost, but it will not necessarily be the cheapest cost. Given a more accurate way to make decisions, the cost will drop. And if the decision method guarantees the most powerful test at each decision point it will have the optimal cost.

It is clear to us that the decision making process is crucial. A survey of methods based on statistical decision theory reveals many powerful tests such as the Maximum-Likelihood Test and Bayes' Test. Each requires the class conditional probability density function, as given by Equation 1. Some, such as the Bayes' Test, also require the a priori probabilities $P(H_0)$ and $P(H_1)$, which are the frequencies at which we would expect an impostor and authentic match attempt. Generally, these tests do not allow the flexibility of specifying a FAR—they minimize making a classification error.

In their seminal paper of 1933 [3], Neyman and Pearson presented a lemma that guarantees the most powerful test for a fixed FAR requiring only the joint class conditional pdf for $H_0$ and $H_1$. This test may be used as the centerpiece of the biometric fusion logic employed in the invention. The Neyman-Pearson Lemma guarantees the validity of the test. The proof of the Lemma is slightly different than those found in other sources, but the reason for presenting it is because it is immediately amenable to proving the *Corollary to the Neyman Pearson Lemma*. The corollary states that fusing two biometric scores with Neyman-Pearson, always provides a more powerful test than either of the component biometrics by themselves. The corollary is extended to state that fusing N biometric scores is better than fusing N−1 scores Deriving the Neyman-Pearson Test: Let FAR=$\alpha$ be fixed. It is desired to find $R_{Au} \subset S$ such that $$\alpha = \int_{R_{Au}} f(x | \text{Im}) dx \text{ and } \int_{R_{Au}} f(x | Au) dx$$

is most powerful. To do this the objective set function is formed that is analogous to Lagrange's Method:

$$u(R_{Au}) = \int_{R_{Au}} f(x | Au) dx - \lambda \left[ \int_{R_{Au}} f(x | \text{Im}) dx - \alpha \right]$$

where $\lambda \geq 0$ is an undetermined Lagrange multiplier and the external value of u is subject to the constraint $$\alpha = \int_{R_{Au}} f(x | \text{Im}) dx.$$

Rewriting the above equation as $$u(R_{Au}) = \int_{R_{Au}} [f(x|Au) - f(x|Im)]dx + \lambda\alpha$$

which ensures that the integrand in the above equation is positive for all $x \in R_{Au}$. Let $\lambda \geq 0$, and, recalling that the class conditional pdf is positive on S is assumed, define $$R_{Au} = \{x : [f(x|Au) - \lambda f(x|Im)] > 0\} = \left\{x : \frac{f(x|Au)}{f(x|Im)} > \lambda\right\}$$

Then u is a maximum if $\lambda$ is chosen such that $$\alpha = \int_{R_{Au}} f(x|Im)dx$$

is satisfied.

The Neyman-Pearson Lemma: Proofs of the Neyman-Pearson Lemma can be found in their paper [4] or in many texts [1] [2]. The proof presented here is somewhat different. An "in-common" region, $R_{IC}$ is established between two partitions that have the same FAR. It is possible this region is empty. Having $R_{IC}$ makes it easier to prove the corollary presented.

Neyman-Pearson Lemma: Given the joint class conditional probability density functions for a system of order N in making a decision with a specified FAR=$\alpha$, let $\lambda$ be a positive real number, and let $$R_{Au} = \left\{x \in S \,\bigg|\, \frac{f(x|Au)}{f(x|Im)} > \lambda\right\} \quad (5)$$

$$R_{Au}^C = R_{Im} = \left\{x \in S \,\bigg|\, \frac{f(x|Au)}{f(x|Im)} \leq \lambda\right\} \quad (6)$$

such that $$\alpha = \int_{R_{Au}} f(x|Im)dx. \quad (7)$$

then $R_{Au}$ is the best critical region for declaring a match—it gives the largest correct-acceptance-rate (CAR), hence $R_\lambda^C$ gives the smallest FRR.

Proof: The lemma is trivially true if $R_{Au}$ is the only region for which Equation (7) holds. Suppose $R_\phi \neq R_{Au}$ with $m(R_\phi \cap R_{Au}^C) > 0$ (this excludes sets that are the same as $R_{Au}$ except on a set of measure zero that contribute nothing to the integration), is any other region such that $$\alpha = \int_{R_\phi} f(x|Im)dx. \quad (8)$$

Let $R_{IC} = R_\phi \cap R_{Au}$, which is the "in common" region of the two sets and may be empty. The following is observed:

$$\int_{R_{Au}} f(x|\theta)dx = \int_{R_{Au}-R_{1C}} f(x|\theta)dx + \int_{R_{1C}} f(x|\theta)dx \quad (9)$$

$$\int_{R_\phi} f(x|\theta)dx = \int_{R_\phi-R_{1C}} f(x|\theta)dx + \int_{R_{1C}} f(x|\theta)dx \quad (10)$$

If $R_{Au}$ has a better CAR than $R_\phi$ then it is sufficient to prove that $$\int_{R_{Au}} f(x|Au)dx - \int_{R_\phi} f(x|Au)dx > 0 \quad (11)$$

From Equations (7), (8), (9), and (10) it is seen that (11) holds if $$\int_{R_{Au}-R_{IC}} f(x|Au)dx - \int_{R_\phi-R_{IC}} f(x|Au)dx > 0 \quad (12)$$

Equations (7), (8), (9), and (10) also gives $$\alpha_{R_\phi-R_{IC}} = \int_{R_{Au}-R_{IC}} f(x|Im)dx = \int_{R_\phi-R_{IC}} f(x|Im)dx \quad (13)$$

When $x \in R_{Au}-R_{IC} \subset R_{Au}$ it is observed from (5) that $$\int_{R_{Au}-R_{IC}} f(x|Au)dx > \int_{R_{Au}-R_{IC}} \lambda f(x|Im)dx = \lambda \alpha_{R_\phi-R_{IC}} \quad (14)$$

and when $x \in R_\phi-R_{IC} \subset R_{Au}^C$ it is observed from (6) that $$\int_{R_\phi-R_{IC}} f(x|Au)dx \leq \int_{R_\phi-R_{IC}} \lambda f(x|Im)dx = \lambda \alpha_{R_\phi-R_{IC}} \quad (15)$$

Equations (14) and (15) give $$\int_{R_{Au}-R_{IC}} f(x|Au)dx > \lambda \alpha_{R_\phi-R_{IC}} \geq \int_{R_\phi-R_{IC}} f(x|Au)dx \quad (16)$$

This establishes (12) and hence (11), which proves the lemma. // In this disclosure, the end of a proof is indicated by double slashes "//".

Corollary: Neyman-Pearson Test Accuracy Improves with Additional Biometrics; The fact that accuracy improves with additional biometrics is an extremely important result of the Neyman-Pearson Lemma. Under the assumed class conditional densities for each biometric, the Neyman-Pearson Test provides the most powerful test over any other test that considers less than all the biometrics available. Even if a biometric has relatively poor performance and is highly correlated to one or more of the other biometrics, the fused CAR is optimal. The corollary for N-biometrics versus a single component biometric follows.

Corollary to the Neyman Pearson Lemma: Given the joint class conditional probability density functions for an N-biometric system, choose $\alpha$=FAR and use the Neyman-Pearson Test to find the critical region $R_{Au}$ that gives the most powerful test for the N-biometric system $$CAR_{R_{Au}} = \int_{R_{Au}} f(x|Au) dx. \quad (17)$$

Consider the $i^{th}$ biometric. For the same $\alpha$=FAR, use the Neyman-Pearson Test to find the critical collection of disjoint intervals $I_{Au} \subset R^1$ that gives the most powerful test for the single biometric, that is, $$CAR_{I_{Au}} = \int_{I_{Au}} f(x_i | Au) dx \quad (18)$$

then $$CAR_{R_{Au}} \geq CAR_{I_{Au}}. \quad (19)$$

Proof: Let $R_i = I_{Au} \times \gamma_1 \times \gamma_2 \times \ldots \times \gamma_N \subset R^N$, where the Cartesian products are taken over all the $\gamma_k$ except for k=i. From (4) the marginal pdf can be recast in terms of the joint pdf $$\int_{R_i} f(x|\theta) dx = \int_{I_{Au}} f(x_i | \theta) dx \quad (20)$$

First, it will be shown that equality holds in (19) if and only if $R_{Au} = R_i$. Given that $R_{Au} = R_i$ except on a set of measure zero, i.e., $m(R_{Au}{}^c \cap R_i) = 0$, then clearly $CAR_{R_{Au}} = CAR_{I_{Au}}$. On the other hand, assume $CAR_{R_{Au}} = CAR_{I_{Au}}$ and $m(R_{Au}{}^c \cap R_i) > 0$, that is, the two sets are measurably different. But this is exactly the same condition previously set forth in the proof of the Neyman-Pearson Lemma from which from which it was concluded that $CAR_{R_{Au}} > CAR_{I_{Au}}$, which is a contradiction. Hence equality holds if and only if $R_{Au} = R_i$. Examining the inequality situation in equation (19), given that $R_{Au} \neq R_i$ such that $m(R_{Au}{}^c \cap R_i) > 0$, then it is shown again that the exact conditions as in the proof of the Neyman-Pearson Lemma have been obtained from which we conclude that $CAR_{R_{Au}} > CAR_{I_{Au}}$, which proves the corollary.

Examples have been built such that $CAR_{R_{Au}} = CAR_{I_{Au}}$ but it is hard to do and it is unlikely that such densities would be seen in a real world application. Thus, it is safe to assume that $CAR_{R_{Au}} > CAR_{I_{Au}}$ is almost always true.

The corollary can be extended to the general case. The fusion of N biometrics using Neyman-Pearson theory always results in a test that is as powerful as or more powerful than a test that uses any combination of M<N biometrics. Without any loss to generality, arrange the labels so that the first M biometrics are the ones used in the M<N fusion. Choose $\alpha$=FAR and use the Neyman-Pearson Test to find the critical region $R_M \subset R^M$ that gives the most powerful test for the M-biometric system. Let $R_N = R_M \times \gamma_{M+1} \times \gamma_{M+2} \times \ldots \times \gamma_N \subset R^N$, where the Cartesian products are taken over all the $\gamma$-intervals not used in the M biometrics combination. Then writing $$\int_{R_N} f(x|\theta) dx \int_{R_M} f(x_1, x_2 \ldots, x_M | \theta) dx \quad (21)$$

gives the same construction as in (20) and the proof flows as it did for the corollary.

We now state and prove the following five mathematical propositions. The first four propositions are necessary to proving the fifth proposition, which will be cited in the section that details the invention. For each of the propositions we will use the following: Let $r = \{r_1, r_2, \ldots, r_n\}$ be a sequence of real valued ratios such that $r_1 \geq r_2 \geq \ldots \geq r_n$. For each $r_i$ we know the numerator and denominator of the ratio, so that $$r_i = \frac{n_i}{d_i},$$

$n_i, d_i > 0 \forall i$.

Proposition #1: For $r_i, r_{i+1} \in r$ and $$r_i = \frac{n_i}{d_i}, r_{i+1} = \frac{n_{i+1}}{d_{i+1}},$$

then $$\frac{n_i + n_{i+1}}{d_i + d_{i+1}} \leq \frac{n_i}{d_i} = r_i.$$

Proof: Because $r_i, r_{i+1} \in r$ we have $$\frac{n_{i+1}}{d_{i+1}} \leq \frac{n_i}{d_i}$$

$$\Rightarrow \frac{d_i n_{i+1}}{n_i d_{i+1}} \leq 1$$

$$\Rightarrow \frac{d_i}{n_i}(n_i + n_{i+1}) \leq d_i + d_{i+1}$$

$$\Rightarrow \frac{n_i + n_{i+1}}{d_i + d_{i+1}} \leq \frac{n_i}{d_i} = r_i$$

Proposition #2: For $r_i, r_{i+1} \in r$ and $$r_i = \frac{n_i}{d_i}, r_{i+1} = \frac{n_{i+1}}{d_{i+1}},$$

then $$r_{i+1} = \frac{n_{i+1}}{d_{i+1}} \leq \frac{n_i + n_{i+1}}{d_i + d_{i+1}}.$$

Proof: The proof is the same as for proposition #1 except the order is reversed.

Proposition #3: For $$r_i = \frac{n_i}{d_i},$$

i=(1, ..., n), then $$\frac{\sum_{i=m}^{M} n_i}{\sum_{i=m}^{M} d_i} \leq \frac{n_m}{d_m},$$

$1 \leq m \leq M \leq n$. Proof: The proof is by induction. We know from proposition #1 that the result holds for N=1, that is $$\frac{n_i + n_{i+1}}{d_i + d_{i+1}} \leq \frac{n_i}{d_i}.$$

Now assume it holds for any N<1, we need to show that it holds for N+1. Let m=2 and M=N+1 (note that this is the $N^{th}$ case and not the N+1 case), then we assume $$\frac{\sum_{i=2}^{N+1} n_i}{\sum_{i=2}^{N+1} d_i} \leq \frac{n_2}{d_2} \leq \frac{n_1}{d_1}$$

$$\Rightarrow \frac{d_1 \sum_{i=2}^{N+1} n_i}{n_1 \sum_{i=2}^{N+1} d_i} \leq 1$$

$$\Rightarrow \frac{d_1}{n_1} \sum_{i=2}^{N+1} n_i \leq \sum_{i=2}^{N+1} d_i$$

$$\Rightarrow \frac{d_1}{n_1} \sum_{i=2}^{N+1} n_i + d_1 \leq \sum_{i=2}^{N+1} d_i + d_1 = \sum_{i=1}^{N+1} d_i$$

$$\Rightarrow d_1 \left( 1 + \frac{\sum_{i=2}^{N+1} n_i}{n_1} \right) \leq \sum_{i=1}^{N+1} d_i$$

$$\Rightarrow d_1 \left( \frac{n_1 + \sum_{i=2}^{N+1} n_i}{n_1} \right) = \frac{d_1}{n_1} \sum_{i=1}^{N+1} n_i \leq \sum_{i=1}^{N+1} d_i$$

$$\Rightarrow \frac{\sum_{i=1}^{N+1} n_i}{\sum_{i=1}^{N+1} d_i} \leq \frac{n_1}{d_1}$$

which is the N+1 case as was to be shown.

Proposition #4: For $$r_i = \frac{n_i}{d_i},$$

i=(1, ..., n), then $$\frac{n_M}{d_M} \leq \frac{\sum_{i=m}^{M} n_i}{\sum_{i=m}^{M} d_i},$$

$1 \leq m \leq M \leq n$.

Proof: As with proposition #3, the proof is by induction. We know from proposition #2 that the result holds for N=1, that is $$\frac{n_{i+1}}{d_{i+1}} \leq \frac{n_i + n_{i+1}}{d_i + d_{i+1}}.$$

The rest of the proof follows the same format as for proposition #3 with the order reversed.

Proposition #5: Recall that the r is an ordered sequence of decreasing ratios with known numerators and denominators. We sum the first N numerators to get $S_n$ and sum the first N denominators to get $S_d$. We will show that for the value $S_n$, there is no other collection of ratios in r that gives the same $S_n$ and a smaller $S_d$. For $$r_i = \frac{n_i}{d_i},$$

i=(1, ..., n), let S be the sequence of the first N terms of r, with the sum of numerators given by $S_n = \sum_{i=1}^{N} n_i$, and the sum of denominators by $S_d = \sum_{i=1}^{N} d_i$, $1 \leq N \leq n$. Let S' be any other sequence of ratios in r, with numerator sum $S'_n = \Sigma n_i$ and denominator sum $S'_d = \Sigma d_i$ such that $S'_n = S_n$, then we have $S_d \leq S'_d$. Proof: The proof is by contradiction. Suppose the proposition is not true, that is, assume another sequence, S', exists such that $S'_d < S_d$. For this sequence, define the indexing sets A={indices that can be between 1 and N inclusive} and B={indices that can be between N+1 and n inclusive}. We also define the indexing set $A^c$={indices between 1 and N inclusive and not in A}, which means $A \cap A^c = \emptyset$ and $A \cup A^c$={all indices between 1 and N inclusive}. Then our assumption states:

$$S'_n = \sum_{i \in A} n_i + \sum_{i \in B} n_i = S_n$$

and $$S'_d = \sum_{i \in A} d_i + \sum_{i \in B} d_i < S_d.$$

This implies that $$\sum_{i\in A} d_i + \sum_{i\in B} d_i < \sum_{i=1}^{N} d_i = \sum_{i\in A} d_i + \sum_{i\in A^c} d_i. \quad (22)$$

$$\Rightarrow \sum_{i\in B} d_i < \sum_{i\in A^c} d_i$$

$$\Rightarrow \frac{1}{\sum_{i\in A^c} d_i} < \frac{1}{\sum_{i\in B} d_i}$$

Because the numerators of both sequences are equal, we can write $$\sum_{i\in A} n_i + \sum_{i\in B} n_i = \sum_{i\in A\cup A^c} n_i \quad (23)$$

$$\Rightarrow \sum_{i\in B} n_i = \sum_{i\in A\cup A^c} n_i - \sum_{i\in A} n_i = \sum_{i\in A^c} n_i$$

Combining (22) and (23), and from propositions #3 and #4, we have $$r_N = \frac{n_N}{d_N} \leq \frac{\sum_{i\in A^c} n_i}{\sum_{i\in A^c} d_i} < \frac{\sum_{i\in B} n_i}{\sum_{i\in B} d_i} \leq \frac{n_{N+1}}{d_{N+1}}$$

$$= r_{N+1},$$

which contradicts the fact that $r_N \geq r_{N+1}$, hence the validity of the proposition follows.

Cost Functions for Optimal Verification and Identification: In the discussion above, it is assumed that all N biometric scores are simultaneously available for fusion. The Neyman-Pearson Lemma guarantees that this provides the most powerful test for a fixed FAR. In practice, however, this could be an expensive way of doing business. If it is assumed that all aspects of using a biometric system, time, risk, etc., can be equated to a cost, then a cost function can be constructed. The inventive process described below constructs the cost function and shows how it can be minimized using the Neyman-Pearson test. Hence, the Neyman-Pearson theory is not limited to "all-at-once" fusion; it can be used for serial, parallel, and hierarchal systems.

Having laid a basis for the invention, a description of two cost functions is now provided as a mechanism for illustrating an embodiment of the invention. A first cost function for a verification system and a second cost function for an identification system are described. For each system, an algorithm is presented that uses the Neyman-Pearson test to minimize the cost function for a second order biometric system, that is a biometric system that has two modalities. The cost functions are presented for the general case of N-biometrics. Because minimizing the cost function is recursive, the computational load grows exponentially with added dimensions. Hence, an efficient algorithm is needed to handle the general case.

First Cost Function—Verification System. A cost function for a 2-stage biometric verification (one-to-one) system will be described, and then an algorithm for minimizing the cost function will be provided. In a 2-stage verification system, a subject may attempt to be verified by a first biometric device. If the subject's identity cannot be authenticated, the subject may attempt to be authenticated by a second biometric. If that fails, the subject may resort to manual authentication. For example, manual authentication may be carried out by interviewing the subject and determining their identity from other means.

The cost for attempting to be authenticated using a first biometric, a second biometric, and a manual check are $c_1$, $c_2$, and $c_3$, respectively. The specified $FAR_{sys}$ is a system false-acceptance-rate, i.e. the rate of falsely authenticating an impostor includes the case of it happening at the first biometric or the second biometric. This implies that the first-biometric station test cannot have a false-acceptance-rate, $FAR_1$, that exceeds $FAR_{sys}$. Given a test with a specified $FAR_1$, there is an associated false-rejection-rate, $FRR_1$, which is the fraction of subjects that, on average, are required to move on to the second biometric station. The FAR required at the second station is $FAR_2 = FAR_{sys} - FAR_1$. It is known that $P(A \cup B) = P(A) + P(B) - P(A)P(B)$, so the computation of $FAR_2$ appears imperfect. However, if $FAR_{sys} = P(A \cup B)$ and $FAR_1 = P(A)$, in the construction of the decision space, it is intended that $FAR_2 = P(B) - P(A)P(B)$.

Note that $FAR_2$ is a function of the specified $FAR_{sys}$ and the freely chosen $FAR_1$; $FAR_2$ is not a free parameter. Given a biometric test with the computed $FAR_2$, there is an associated false-rejection-rate, $FRR_2$ by the second biometric test, which is the fraction of subjects that are required to move on to a manual check. This is all captured by the following cost function:

$$\text{Cost} = c_1 + FRR_1(c_2 + c_3 FRR_2) \quad (30)$$

There is a cost for every choice of $FAR_1 \leq FAR_{sys}$, so the Cost in Equation 30 is a function of $FAR_1$. For a given test method, there exists a value of $FAR_1$ that yields the smallest cost and we present an algorithm to find that value. In a novel approach to the minimization of Equation 30, a modified version of the Neyman-Pearson decision test has been developed so that the smallest cost is optimally small.

An algorithm is outlined below. The algorithm seeks to optimally minimize Equation 30. To do so, we (a) set the initial cost estimate to infinity and, (b) for a specified $FAR_{sys}$, loop over all possible values of $FAR_1 \leq FAR_{sys}$. In practice, the algorithm may use a uniformly spaced finite sample of the infinite possible values. The algorithm may proceed as follows: (c) set $FAR_1 = FAR_{sys}$, (d) set Cost=$\infty$, and (e) loop over possible $FAR_1$ values. For the first biometric at the current $FAR_1$ value, the algorithm may proceed to (f) find the optimal Match-Zzone, $R_1$, and (g) compute the correct-acceptance-rate over $R_1$ by:

$$CAR_1 = \int_{R_1} f(x \mid Au)\,dx \quad (31)$$

and (h) determine $FRR_1$ using $FRR_1 = 1 - CAR_1$.

Next, the algorithm may test against the second biometric. Note that the region $R_1$ of the score space is no longer available since the first biometric test used it up. The Neyman-Pearson test may be applied to the reduced decision space, which is the compliment of $R_1$. So, at this time, (h) the algorithm may compute $FAR_2 = FAR_{sys} - FAR_1$, and $FAR_2$ may be (i) used in the Neyman-Pearson test to determine the most powerful test, $CAR_2$, for the second biometric fused with the first biometric over the reduced decision space $R_1^C$. The critical region for $CAR_2$ is $R_2$, which is disjoint from $R_1$ by our construction. Score pairs that result in the failure to be authenticated at either biometric station must fall within the region $R_3 = (R_1 \cup R_2)^C$, from which it is shown that $$FRR_2 = \frac{\int_{R_3} f(x \mid Au) dx}{FRR_1}$$

The final steps in the algorithm are (j) to compute the cost using Equation 30 at the current setting of $FAR_1$ using $FRR_1$ and $FRR_2$, and (k) to reset the minimum cost if cheaper, and keep track of the $FAR_1$ responsible for the minimum cost.

To illustrate the algorithm, an example is provided. Problems arising from practical applications are not to be confused with the validity of the Neyman-Pearson theory. Jain states in [5]: "In case of a larger number of classifiers and relatively small training data, a classifier my actually degrade the performance when combined with other classifiers . . . " This would seem to contradict the corollary and its extension. However, the addition of classifiers does not degrade performance because the underlying statistics are always true and the corollary assumes the underlying statistics. Instead, degradation is a result of inexact estimates of sampled densities. In practice, a user may be forced to construct the decision test from the estimates, and it is errors in the estimates that cause a mismatch between predicted performance and actual performance.

Given the true underlying class conditional pdf for, $H_0$ and $H_1$, the corollary is true. This is demonstrated with a challenging example using up to three biometric sensors. The marginal densities are assumed to be Gaussian distributed. This allows a closed form expression for the densities that easily incorporates correlation. The general $n^{th}$ order form is well known and is given by $$f(x \mid \theta) = \frac{1}{(2\pi)^{\frac{n}{2}} |C|^{1/2}} \exp\left(-\frac{1}{2}[(x-\mu)^T C^{-1}(x-\mu)]\right) \quad (32)$$

where $\mu$ is the mean and C is the covariance matrix. The mean ($\mu$) and the standard deviation ($\sigma$) for the marginal densities are given in Table 1. Plots of the three impostor and three authentic densities are shown in Error! Reference source not found.

TABLE 1

| Biometric | Impostors | | Authentics | |
|---|---|---|---|---|
| Number | μ | Σ | μ | σ |
| #1 | 0.3 | 0.06 | 0.65 | 0.065 |
| #2 | 0.32 | 0.065 | 0.58 | 0.07 |
| #3 | 0.45 | 0.075 | 0.7 | 0.08 |

TABLE 2

| Correlation Coefficient | Impostors | Authentics |
|---|---|---|
| $\rho_{12}$ | 0.03 | 0.83 |
| $\rho_{13}$ | 0.02 | 0.80 |
| $\rho_{23}$ | 0.025 | 0.82 |

Figure 7:
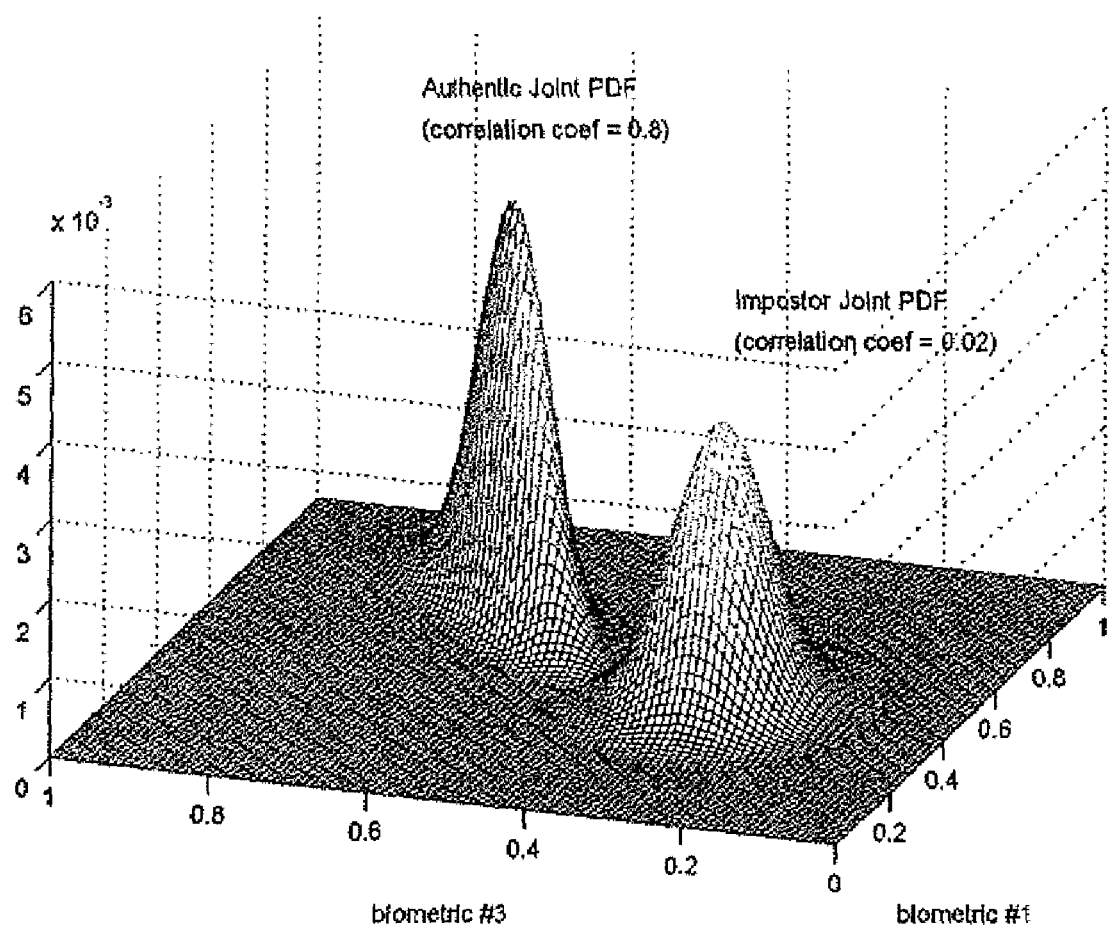
FIG. 7, which represents a joint PDF for two systems.

To stress the system, the authentic distributions for the three biometric systems may be forced to be highly correlated and the impostor distributions to be lightly correlated. The correlation coefficients ($\rho$) are shown in Table 2. The subscripts denote the connection. A plot of the joint pdf for the fusion of system #1 with system #2 is shown in FIG. 7, where the correlation between the authentic distributions is quite evident.

Figure 6:
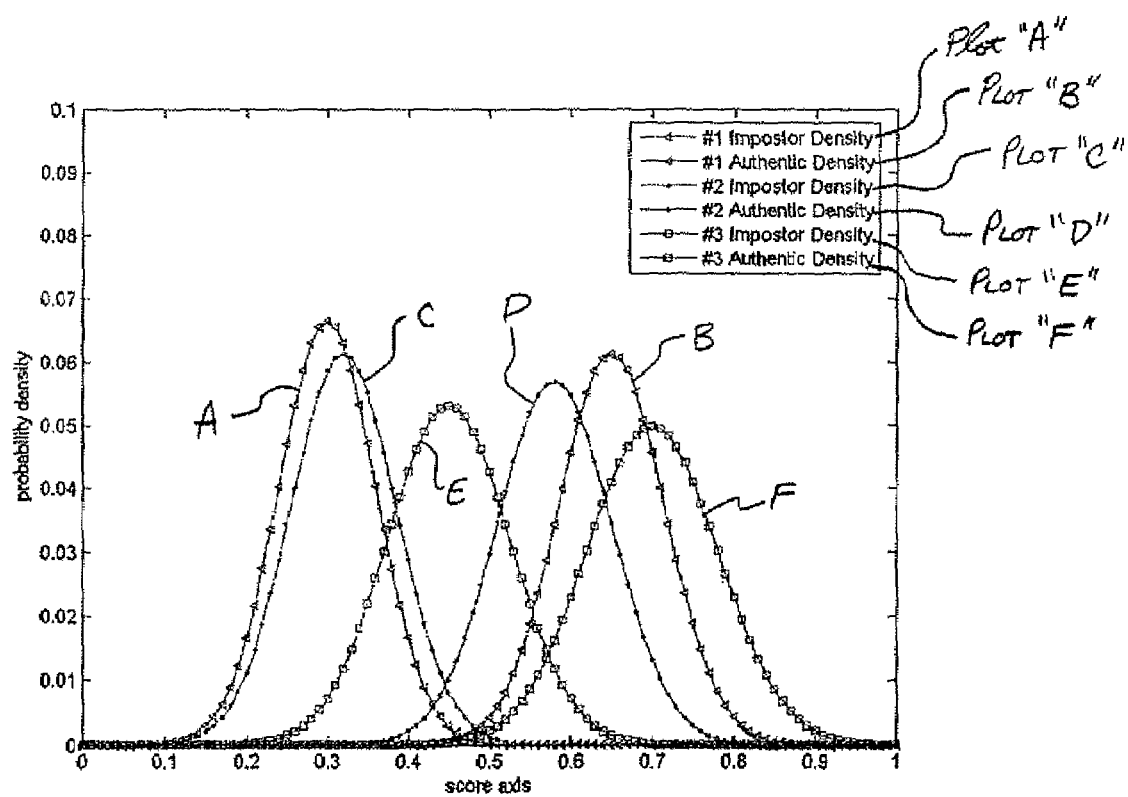
FIG. 6, which represents example PDFs for three biometrics data sets.

The single biometric ROC curves are shown in FIG. 8. As could be predicted from the pdf curves plotted in FIG. 6, System #1 performs much better than the other two systems, with System #3 having the worst performance.

Fusing 2 systems at a time; there are three possibilities: #1+#2, #1+#3, and #2+#3. The resulting ROC curves are shown in FIG. 9. As predicted by the corollary, each 2-system pair outperforms their individual components. Although the fusion of system #2 with system #3 has worse performance than system #1 alone, it is still better than the single system performance of either system #2 or system #3.

Finally, FIG. 10 depicts the results when fusing all three systems and comparing its performance with the performance of the 2-system pairs. The addition of the third biometric system gives substantial improvement over the best performing pair of biometrics.

Tests were conducted on individual and fused biometric systems in order to determine whether the theory presented above accurately predicts what will happen in a real-world situation. The performance of three biometric systems were considered. The numbers of score samples available are listed in Table 3. The scores for each modality were collected independently from essentially disjoint subsets of the general population.

TABLE 3

| Biometric | Number of Impostor Scores | Number of Authentic Scores |
|---|---|---|
| Fingerprint | 8,500,000 | 21,563 |
| Signature | 325,710 | 990 |
| Facial Recognition | 4,441,659 | 1,347 |

To simulate the situation of an individual obtaining a score from each biometric, the initial thought was to build a "virtual" match from the data of Table 3. Assuming independence between the biometrics, a 3-tuple set of data was constructed. The 3-tuple set was an ordered set of three score values, by arbitrarily assigning a fingerprint score and a facial recognition score to each signature score for a total of 990 authentic score 3-tuples and 325,710 impostor score 3-tuples.

By assuming independence, it is well known that the joint pdf is the product of the marginal density functions, hence the joint class conditional pdf for the three biometric systems, $f(x|\theta) = f(x_1, x_2, x_3 | \theta)$ can be written as $$f(x|\theta) = f_{fingerprint}(x|\theta) f_{signature}(x|\theta) f_{facial}(x|\theta) \quad (33)$$

So it is not necessary to dilute the available data. It is sufficient to approximate the appropriate marginal density functions for each modality using all the data available, and compute the joint pdf using Equation 33.

The class condition density functions for each of the three modalities, $f_{fingerprint}(x|\theta)$, $f_{signature}(x|\theta)$ and $f_{facial}(x|\theta)$, were estimated using the available sampled data. The authentic score densities were approximated using two methods: (1) the histogram-interpolation technique and (2) the Parzen-window method. The impostor densities were approximated using the histogram-interpolation method. Although each of these estimation methods are guaranteed to converge in probability to the true underlying density as the number of samples goes to infinity, they are still approximations and can introduce error into the decision making process, as will be seen in the next section. The densities for fingerprint, signature, and facial recognition are shown in FIG. 11, FIG. 12 and FIG. 13 respectively. Note that the authentic pdf for facial recognition is bimodal. The Neyman-Pearson test was used to determine the optimal ROC for each of the modalities. The ROC curves for fingerprint, signature, and facial recognition are plotted in FIG. 14.

There are three possible unique pairings of the three biometric systems: (1) fingerprints with signature, (2) fingerprints with facial recognition, and (3) signatures with facial recognition. Using the marginal densities (above) to create the required 2-D joint class conditional density functions, two sets of 2-D joint density functions were computed—one in which the authentic marginal densities were approximated using the histogram method, and one in which the densities were approximated using the Parzen window method. Using the Neyman-Pearson test, an optimal ROC was computed for each fused pairing and each approximation method. The ROC curves for the histogram method are shown in FIG. 15 and the ROC curves for the Parzen window method are shown in FIG. 16.

As predicted by the corollary, the fused performance is better than the individual performance for each pair under each approximation method. But, as we cautioned in the example, error due to small sample sizes can cause pdf distortion. This is apparent when fusing fingerprints with signature data (see FIG. 15 and FIG. 16). Notice that the Parzen-window ROC curve (FIG. 16) crosses over the curve for fingerprint-facial-recognition fusion, but does not cross over when using the histogram interpolation method (FIG. 15). Small differences between the two sets of marginal densities are magnified when using their product to compute the 2-dimensional joint densities, which is reflected in the ROC.

As a final step, all three modalities were fused. The resulting ROC using histogram interpolating is shown in FIG. 17, and the ROC using the Parzen window is shown in FIG. 18. As might be expected, the Parzen window pdf distortion with the 2-dimensional fingerprint-signature case has carried through to the 3-dimensional case. The overall performance, however, is dramatically better than any of the 2-dimensional configurations as predicted by the corollary.

In the material presented above, it was assumed that all N biometric scores would be available for fusion. Indeed, the Neyman-Pearson Lemma guarantees that this provides the most powerful test for a fixed FAR. In practice, however, this could be an expensive way of doing business. If it is assumed that all aspects of using a biometric system, time, risk, etc., can be equated to a cost, then a cost function can be constructed. Below, we construct the cost function and show how it can be minimized using the Neyman-Pearson test. Hence, the Neyman-Pearson theory is not limited to "all-at-once" fusion—it can be used for serial, parallel, and hierarchal systems.

In the following section, a review of the development of the cost function for a verification system is provided, and then a cost function for an identification system is developed. For each system, an algorithm is presented that uses the Neyman-Pearson test to minimize the cost function for a second order modality biometric system. The cost function is presented for the general case of N-biometrics. Because minimizing the cost function is recursive, the computational load grows exponentially with added dimensions. Hence, an efficient algorithm is needed to handle the general case.

From the prior discussion of the cost function for a 2-station system, the costs for using the first biometric, the second biometric, and the manual check are $c_1, c_2$, and $c_3$, respectively, and $FAR_{sys}$ is specified. The first-station test cannot have a false-acceptance-rate, $FAR_1$, that exceeds $FAR_{sys}$. Given a test with a specified $FAR_1$, there is an associated false-rejection-rate, $FRR_1$, which is the fraction of subjects that, on averages are required to move on to the second station. The FAR required at the second station is $FAR_2 = FAR_{sys} - FAR_1$. It is known that $P(A \cup B) = P(A) + P(B) - P(A)P(B)$, so the computation of $FAR_2$ appears imperfect. However, if $FAR_{sys} = P(A \cup B)$ and $FAR_1 = P(A)$, in the construction of the decision space, it is intended that $FAR_2 = P(B) - P(A)P(B)$.

Given a test with the computed $FAR_2$, there is an associated false-rejection-rate, $FRR_2$ by the second station, which is the fraction of subjects that are required to move on to a manual checkout station. This is all captured by the following cost function $$\text{Cost} = c_1 + FRR_1(c_2 + c_3 FRR_2) \quad (30)$$

There is a cost for every choice of $FAR_1 \leq FAR_{sys}$, so the Cost in Equation 30 is a function of $FAR_1$. For a given test method, there exists a value of $FAR_1$ that yields the smallest cost and we develop an algorithm to find that value.

Using a modified Neyman-Pearson test to optimally minimize Equation 30, an algorithm can be derived. Step 1: set the initial cost estimate to infinity and, for a specified $FAR_{sys}$, loop over all possible values of $FAR_1 \leq FAR_{sys}$. To be practical, in the algorithm a finite sample of the infinite possible values may be used. The first step in the loop is to use the Neyman-Pearson test at $FAR_1$ to determine the most powerful test, $CAR_1$, for the first biometric, and $FRR_1 = 1 - CAR_1$ is computed. Since it is one dimensional, the critical region is a collection of disjoint intervals $I^{Au}$. As in the proof to the corollary, the I-dimensional $I_{Au}$ is recast as a 2-dimensional region, $R_1 = I_{Au} \times \gamma_2 \subset R^2$, so that $$CAR_I = \int_{R_I} f(x \mid Au) dx = \int_{I_{Au}} f(x_I \mid Au) dx \quad (34)$$

When it is necessary to test against the second biometric, the region $R_1$ of the decision space is no longer available since the first test used it up. The Neyman-Pearson test can be applied to the reduced decision space, which is the compliment of $R_1$. Step 2: $FAR_2 = FAR_{sys} - FAR_1$ is computed. Step 3: $FAR_2$ is used in the Neyman-Pearson test to determine the most powerful test, $CAR_2$, for the second biometric fused with the first biometric over the reduced decision space $R_1^C$. The critical region for $CAR_2$ is $R_2$, which is disjoint from $R_1$ by the construction. Score pairs that result in the failure to be authenticated at either biometric station must fall within the region $R_3 = (R_1 \cup R_2)^C$, from which it is shown that $$FRR_2 = \frac{\int_{R_3} f(x \mid Au) dx}{FRR_1}$$

Step 4: compute the cost at the current setting of $FAR_1$ using $FRR_1$ and $FRR_2$. Step 5: reset the minimum cost if cheaper, and keep track of the $FAR_1$ responsible for the minimum cost. A typical cost function is shown in FIG. 19.

Two special cases should be noted. In the first case, if $c_1>0$, $c_2>0$, and $c_3=0$, the algorithm shows that the minimum cost is to use only the first biometric—that is, $FAR_1=FAR_{sys}$. This makes sense because there is no cost penalty for authentication failures to bypass the second station and go directly to the manual check.

In the second case, $c_1=c_2=0$ and $c_3>0$, the algorithm shows that scores should be collected from both stations and fused all at once; that is, $FAR_1=1.0$. Again, this makes sense because there is no cost penalty for collecting scores at both stations, and because the Neyman-Pearson test gives the most powerful CAR (smallest FRR) when it can fuse both scores at once.

To extend the cost function to higher dimensions, the logic discussed above is simply repeated to arrive at $$Cost = c_1 + c_2 FRR_1 + c_3 \prod_{i=1}^{2} FRR_i + \ldots + c_{N+1} \prod_{i=1}^{N} FRR_i \qquad (35)$$

In minimizing Equation 35, there is 1 degree of freedom, namely $FAR_1$. Equation 35 has N−1 degrees of freedom. When $FAR_1 \leq FAR_{sys}$ are set, then $FAR_2 \leq FAR_1$ can bet set, then $FAR_3 \leq FAR_2$, and so on—and to minimize thus, N−1 levels of recursion.

Identification System: Identification (one-to-many) systems are discussed. With this construction, each station attempts to discard impostors. Candidates that cannot be discarded are passed on to the next station. Candidates that cannot be discarded by the biometric systems arrive at the manual checkout. The goal, of course, is to prune the number of impostor templates thus limiting the number that move on to subsequent steps. This is a logical AND process—for an authentic match to be accepted, a candidate must pass the test at station 1 and station 2 and station 3 and so forth. In contrast to a verification system, the system administrator must specify a system false-rejection-rate, $FRR_{sys}$ instead of a $FAR_{sys}$. But just like the verification system problem the sum of the component FRR values at each decision point cannot exceed $FRR_{sys}$. If FRR with FAR are replaced in Equations 34 or 35 the following cost equations are arrived at for 2-biometric and an N-biometric identification system $$Cost = c_1 + FAR_1(c_2 + c_3 FAR_2) \qquad (36)$$

$$Cost = c_1 + c_2 FAR_1 + c_3 \prod_{i=1}^{2} FAR_i + \ldots + c_{N+1} \prod_{i=1}^{N} FAR_i \qquad (37)$$

Alternately, equation 37 may be written as:

$$Cost = \sum_{j=0}^{N} \left( c_{j+1} \prod_{i=1}^{j} FAR_i \right), \qquad (37A)$$

These equations are a mathematical dual of Equations 34 and 35 are thus minimized using the logic of the algorithm that minimizes the verification system.

Algorithm: Generating Matching and Non-Matching PDF Surfaces. The optimal fusion algorithm uses the probability of an authentic match and the probability of a false match for each $p_{ij} \in P$. These probabilities may be arrived at by numerical integration of the sampled surface of the joint pdf. A sufficient number of samples may be generated to get a "smooth" surface by simulation. Given a sequence of matching score pairs and non-matching score pairs, it is possible to construct a numerical model of the marginal cumulative distribution functions (cdf). The distribution functions may be used to generate pseudo random score pairs. If the marginal densities are independent, then it is straightforward to generate sample score pairs independently from each cdf. If the densities are correlated, we generate the covariance matrix and then use Cholesky factorization to obtain a matrix that transforms independent random deviates into samples that are appropriately correlated.

Assume a given partition P. The joint pdf for both the authentic and impostor cases may be built by mapping simulated score pairs to the appropriate $P_{ij} \in P$ and incrementing a counter for that sub-square. That is, it is possible to build a 2-dimensional histogram, which is stored in a 2-dimensional array of appropriate dimensions for the partition. If we divide each array element by the total number of samples, we have an approximation to the probability of a score pair falling within the associated sub-square. We call this type of an array the probability partition array (PPA). Let $P_{fm}$ be the PPA for the joint false match distribution and let $P_m$ be the PPA for the authentic match distribution. Then, the probability of an impostor's score pair, $(s_1,s_2) \in P_{ij}$, resulting in a match is $P_{fm}(i,j)$. Likewise, the probability of a score pair resulting in a match when it should be a match is $P_m(i,j)$. The PPA for a false reject (does not match when it should) is $P_{fr}=1-P_m$.

Consider the partition arrays, $P_{fm}$ and $P_m$, defined in Section #5. Consider the ratio $$\frac{P_{fm}(i,j)}{P_m(i,j)}, P_{fr} > 0.$$

The larger this ratio the more the sub-square indexed by (i,j) favors a false match over a false reject. Based on the propositions presented in Section 4, it is optimal to tag the sub-square with the largest ratio as part of the no-match zone, and then tag the next largest, and so on.

Therefore, an algorithm that is in keeping with the above may proceed as:

Step 1. Assume a required FAR has been given.

Step 2. Allocate the array $P_{mz}$ to have the same dimensions as $P_m$ and $P_{fm}$. This is the match zone array. Initialize all of its elements as belonging to the match zone.

Step 3. Let the index set A={all the (i,j) indices for the probability partition arrays}.

Step 4. Identify all indices in A such that $P_m(i,j)=P_{fm}(i,j)=0$ and store those indices in the indexing set Z={(i,j): $P_m(i,j)=P_{fm}(i,j)=0$}. Tag each element in $P_{mz}$ indexed by Z as part of the no-match zone.

Step 5. Let B=A−Z={(i,j): $P_m(i,j) \neq 0$ and $P_{fm}(i,j) \neq 0$}. We process only those indices in B. This does not affect optimality because there is most likely zero probability that either a false match score pair or a false reject score pair falls into any sub-square indexed by elements of Z.

Step 6. Identify all indices in B such that
$P_{fm}(i,j)>0$ and $P_m(i,j)=0$ and store those indices in $Z_\infty=\{(i,j)_k$:

$P_{fm}(i,j)>0$, $P_m(i,j)=0\}$. Simply put, this index set includes the indexes to all the sub-squares that have zero probability of a match but non-zero probability of false match.

Step 7. Tag all the sub-squares in $P_{mz}$ indexed by $Z_\infty$ as belonging to the no-match zone. At this point, the probability of a matching score pair falling into the no-match zone is zero, The probability of a non-matching score pair falling into the match zone is:

$$FAR_{Z_\infty}=1-\Sigma_{(i,j)\in Z_\infty}P_{fm}(i,j)$$

Furthermore, if $FAR_{Z_\infty}<=FAR$ then we are done and can exit the algorithm.

Step 8 Otherwise, we construct a new index set $$C = A - Z - Z_\infty$$
$$= \left\{(i, j)_k: P_{fm}(i, j)_k > 0, P_m(i, j)_k > 0, \frac{P_{fm}(i, j)_k}{P_m(i, j)_k} >= \frac{P_{fm}(i, j)_{k+1}}{P_m(i, j)_{k+1}}\right\}.$$

We see that C holds the indices of the non-zero probabilities in a sorted order—the ratios of false-match to match probabilities occur in descending order.

Step 9. Let $C_N$ be the index set that contains the first N indices in C. We determine N so that:

$$FAR_{Z_\infty \cup C_N}=1-\Sigma_{(i,j)\in Z_\infty}P_{fm}(i,j)-\Sigma_{(i,j)\in C_N}P_{fm}(i,j)\leq FAR$$

Step 10. Label elements of $P_{mz}$ indexed by members of $C_N$ as belonging to the no-match zone. This results in a FRR given by $$FRR=\Sigma_{(i,j)\in C_N}P_m(i,j),$$

and furthermore this FRR is optimal.

It will be recognized that other variations of these steps may be made, and still be within the scope of the invention. For clarity, the notation "(i,j)" is used to identify arrays that have at least two modalities. Therefore, the notation "(i,j)" includes more than two modalities, for example (i,j,k), (i,j,k, l), (i,j,k,l,m), etc.

Figure 20:
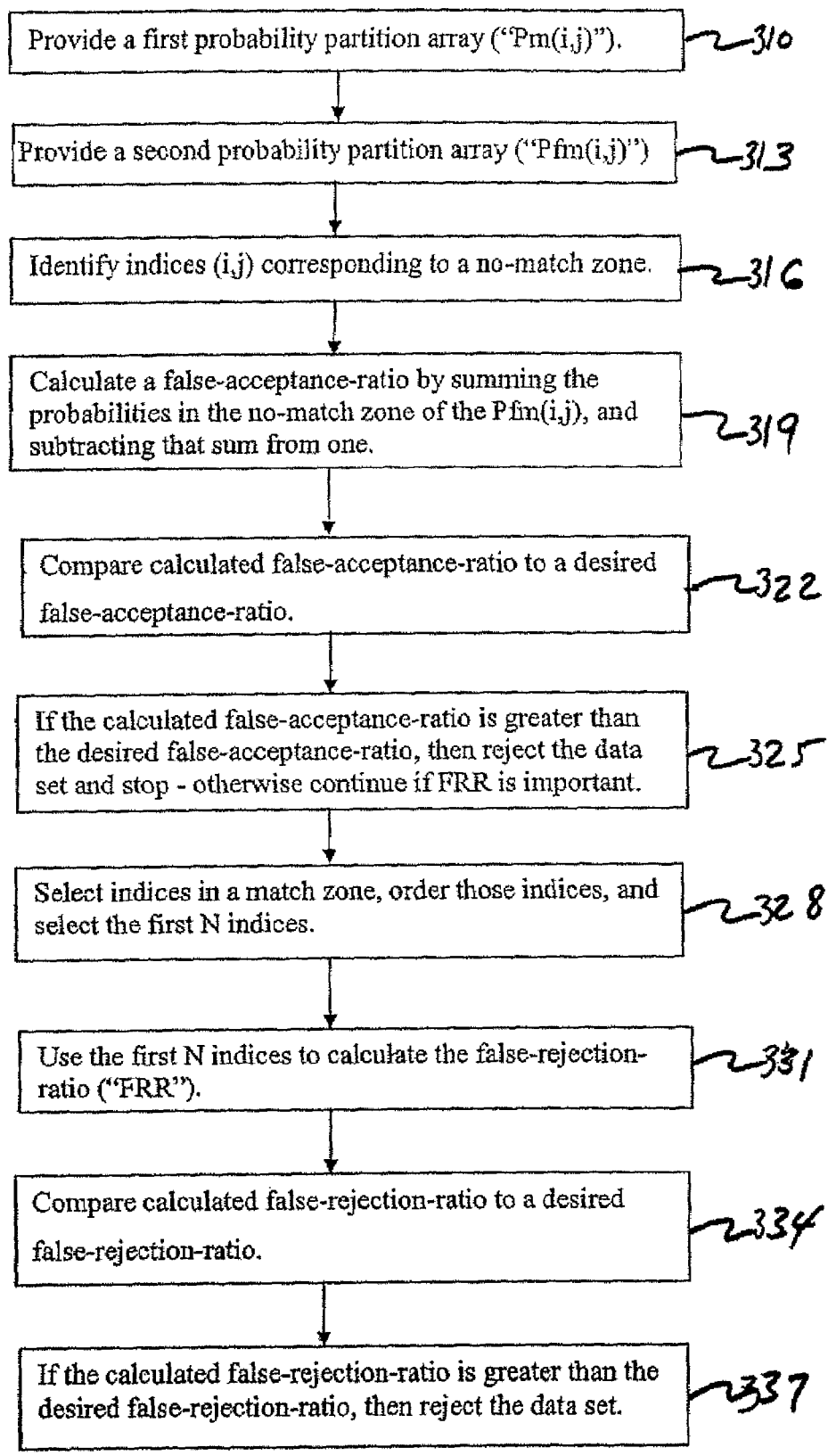
FIG. 20, which depicts a method according to the invention.

For example, FIG. 20 illustrates one method according to the invention in which Pm(i,j) is provided 310 and Pfm(i,j) is provided 313. As part of identifying 316 indices (i,j) corresponding to a no-match zone, a first index set ("A") may be identified. The indices in set A may be the (i,j) indices that have values in both Pfm(i,j) and Pm(i,j). A second index set ("Z∞") may be identified, the indices of Z∞ being the (i,j) indices in set A where both Pfm(i,j) is larger than zero and Pm(i,j) is equal to zero. Then determine $FAR_{Z_\infty}$ 319, where $FAR_{Z_\infty}=1-\Sigma_{(i,j)\in Z_\infty}P_{fm}(i,j)$. It should be noted that the indices of Z∞ may be the indices in set A where Pm(i,j) is equal to zero, since the indices where both Pfm(i,j)=Pm(i,j)=0 will not affect $FAR_{Z_\infty}$, and since there will be no negative values in the probability partition arrays. However, since defining the indices of Z∞ to be the (i,j) indices in set A where both Pfm(i,j) is larger than zero and Pm(i,j) is equal to zero yields the smallest number of indices for $Z_\infty$, we will use that definition for illustration purposes since it is the least that must be done for the mathematics of $FAR_{Z_\infty}$ to work correctly. It will be understood that larger no-match zones may be defined, but they will include Z∞, so we illustrate the method using the smaller Z∞ definition believing that definitions of no-match zones that include Z∞ will fall within the scope of the method described.

$FAR_{Z_\infty}$ may be compared 322 to a desired false-acceptance-rate ("FAR"), and if $FAR_{Z_\infty}$ is less than or equal to the desired false-acceptance-rate, then the data set may be accepted, if false-rejection-rate is not important. If $FAR_{Z_\infty}$ is greater than the desired false-acceptance-rate, then the data set may be rejected 325.

If false-rejection-rate is important to determining whether a data set is acceptable, then indices in a match zone may be selected, ordered, and some of the indices may be selected for further calculations 328. Toward that end, the following steps may be carried out. The method may further include identifying a third index set ZM∞, which may be thought of as a modified Z∞, that is to say a modified no-match zone. Here we modify Z∞ so that ZM∞ includes indices that would not affect the calculation for $FAR_{Z_\infty}$, but which might affect calculations related to the false-rejection-rate. The indices of ZM∞ may be the (i,j) indices in Z∞ plus those indices where both Pfm(i,j) and Pm(i,j) are equal to zero. The indices where Pfm(i,j)=Pm(i,j)=0 are added to the no-match zone because in the calculation of a fourth index set ("C"), these indices should be removed from consideration. The indices of C may be the (i,j) indices that are in A but not ZM∞. The indices of C may be arranged such that $$\frac{P_{fm}(i, j)_k}{P_m(i, j)_k} >= \frac{P_{fm}(i, j)_{k+1}}{P_m(i, j)_{k+1}}$$

to provide an arranged C index. A fifth index set ("Cn") may be identified. The indices of Cn may be the first N (i,j) indices of the arranged C index, where N is a number for which the following is true:

$$FAR_{Z_\infty \cup C_N}=1-\Sigma_{(i,j)\in Z_\infty}P_{fm}(i,j)-\Sigma_{(i,j)\in C_N}P_{fm}(i,j)\leq FAR.$$

The FRR may be determined 331, where $FRR=\Sigma_{(i,j)\in C_N}P_m(i,j)$, and compared 334 to a desired false-rejection-rate. If FRR is greater than the desired false-rejection-rate, then the data set may be rejected 337, even though $FAR_{Z_\infty}$ is less than or equal to the desired false-acceptance-rate. Otherwise, the data set may be accepted.

Figure 21:
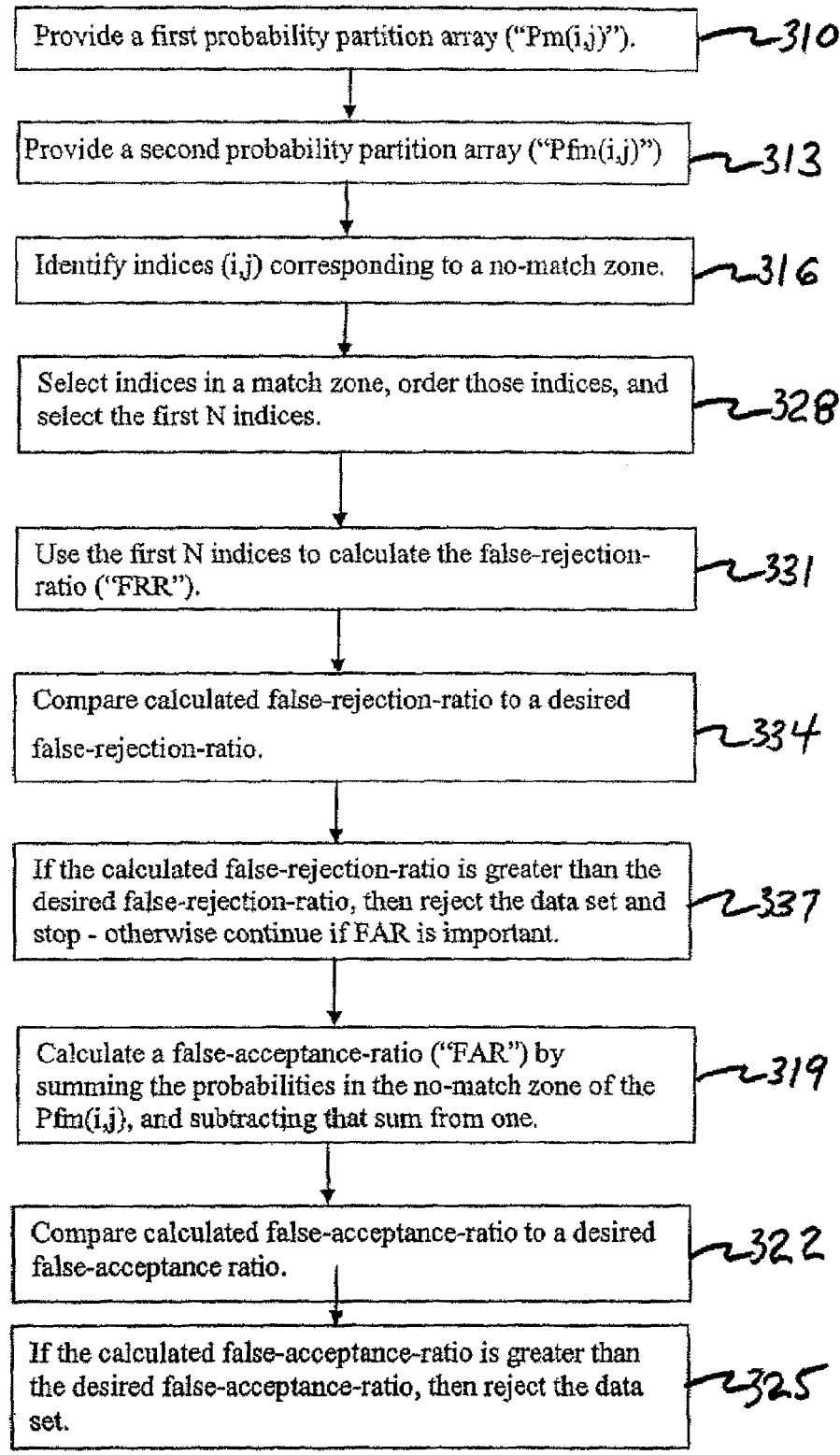
FIG. 21, which depicts another method according to the invention.

FIG. 21 illustrates another method according to the invention in which the FRR may be calculated first. In FIG. 21, the reference numbers from FIG. 20 are used, but some of the steps in FIG. 21 may vary somewhat from those described above. In such a method, a first index set ("A") may be identified, the indices in A being the (i,j) indices that have values in both Pfm(i,j) and Pm(i,j). A second index set ("Z∞"), which is the no match zone, may be identified 316. The indices of Z∞ may be the (i,j) indices of A where Pm(i,j) is equal to zero. Here we use the more inclusive definition for the no-match zone because the calculation of set C comes earlier in the process. A third index set ("C") may be identified, the indices of C being the (i,j) indices that are in A but not Z∞. The indices of C may be arranged such that $$\frac{P_{fm}(i, j)_k}{P_m(i, j)_k} >= \frac{P_{fm}(i, j)_{k+1}}{P_m(i, j)_{k+1}}$$

to provide an arranged C index, and a fourth index set ("Cn") may be identified. The indices of Cn may be the first N (i,j) indices of the arranged C index, where N is a number for which the following is true: $FAR_{Z_\infty \cup C_N}=1-\Sigma_{(i,j)\in Z_\infty}P_{fm}(i,j)-\Sigma_{(i,j)\in C_N}P_{fm}(i,j)\leq FAR$. The FRR may be determined, where $FRR=\Sigma_{(i,j)\in C_N}P_m(i,j)$, and compared to a desired false-rejection-rate. If the FRR is greater than the desired false-rejection-rate, then the data set may be rejected. If the FRR is less than or equal to the desired false-rejection-rate, then the data set may be accepted, if false-acceptance-rate is not important. If false-acceptance-rate is important, the $FAR_{Z\infty}$ may be determined, where $FAR_{Z\infty}=1-\Sigma_{(i,j)\in Z_\infty}P_{fm}(i,j)$. Since the more inclusive definition is used for $Z\infty$ in this method, and that more inclusive definition does not affect the value of $FAR_{Z\infty}$, we need not add back the indices where both $Pfm(i,j)=Pm(i,j)=0$. The $FAR_{Z\infty}$ may be compared to a desired false-acceptance-rate, and if $FAR_{Z\infty}$ is greater than the desired false-acceptance-rate, then the data set may be rejected. Otherwise, the data set may be accepted.

It may now be recognized that a simplified form of a method according to the invention may be executed as follows.

step 1: provide a first probability partition array ("Pm(i,j)"), the Pm(i,j) being comprised of probability values for information pieces in the data set, each probability value in the Pm(i,j) corresponding to the probability of an authentic match;

step 2: provide a second probability partition array ("Pfm(i,j)"), the Pfm(i,j) being comprised of probability values for information pieces in the data set, each probability value in the Pfm(i,j) corresponding to the probability of a false match;

step 3: identify a first index set ("A"), the indices in set A being the (i,j) indices that have values in both Pfm(i,j) and Pm(i,j);

step 4: execute at least one of the following;

(a) identify a first no-match zone ("Z1∞") that includes at least the indices of set A for which both Pfm(i,j) is larger than zero and Pm(i,j) is equal to zero, and use Z1∞ to determine $FAR_{Z\infty}$, where $FAR_{Z\infty}=1-\Sigma_{(i,j)\in Z_\infty}P_{fm}(i,j)$, and compare $FAR_{Z\infty}$ to a desired false-acceptance-rate, and if $FAR_{Z\infty}$ is greater than the desired false-acceptance-rate, then reject the data set;

(1) identify a second no-match zone ("Z2∞") that includes the indices of set A for which Pm(i,j) is equal to zero, and use Z2∞ to identify a second index set ("C"), the indices of C being the (i,j) indices that are in A but not Z2∞, and arrange the (i,j) indices of C such that $$\frac{P_{fm}(i,j)_k}{P_m(i,j)_k} >= \frac{P_{fm}(i,j)_{k+1}}{P_m(i,j)_{k+1}}$$

to provide an arranged C index, and identify a third index set ("Cn"), the indices of Cn being the first N (i,j) indices of the arranged C index, where N is a number for which the following is true:

$$FAR_{Z_x \sim C_N} = 1 - \sum_{(i,j)\in Z_x} P_{fm}(i,j) - \sum_{(i,j)\in C_N} P_{fm}(i,j) \leq FAR$$

and determine $FRR$, where $FDD = \sum_{(i,j)\in C_N} P_m(i,j)$, and compare FRR to a desired false-rejection-rate, and if FRR is greater than the desired false-rejection-rate, then reject the data set.

If $FAR_{Z\infty}$ is less than or equal to the desired false-acceptance-rate, and FRR is less than or equal to the desired false-rejection-rate, then the data set may be accepted. Z1∞ may be expanded to include additional indices of set A by including in Z1∞ the indices of A for which Pm(i,j) is equal to zero. In this manner, a single no-match zone may be defined and used for the entire step 4.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of authorizing a transaction, comprising:

enrolling at least two biometric specimens, a first one of the specimens being a first type, and a second one of the specimens being a second type;

determining a false acceptance ratio ("FAR") for each of the specimens, wherein at least one of the false acceptance ratios is determined using the following equation $$FAR = P_{Type\,I} = P(x \in R_{Au} \mid \text{Im}) = \int_{R_{Au}} f(x \mid \text{Im}) dx;$$

identifying authorization options, each option requiring a match to one or more of the biometric specimens;

calculating a cost value for at least one of the options to provide a calculated cost value ("CCV"), wherein the CCV is a function of the FAR(s) of the specimen(s) corresponding to the option;

identifying an acceptable cost value range ("ACV range");

comparing the CCV to the ACV range;

determining whether the CCV is in the ACV range;

selecting the option if the CCV is in the ACV range;

providing a set of biometric sample(s) (the "sample set"), the sample set having biometric sample(s) of the same type(s) as those corresponding to the selected option;

comparing the biometric sample(s) to the biometric specimen(s);

determining whether the biometric sample(s) match the biometric specimen(s); and if the biometric sample(s) match the biometric specimen(s), then authorizing the transaction.

2. The method of claim 1, wherein the types are selected from fingerprint, facial image, retinal image, iris scan, hand geometry scan, voice print, signature, signature gait, keystroke tempo, blood vessel pattern, palm print, skin composition spectrum, lip shape and ear shape.

3. The method of claim 1, wherein a first type corresponds to a first body part and a second type corresponds to a second body part.

4. The method of claim 1, wherein the biometric specimens comprise a set, and the options comprise permutations of the set.

5. The method of claim 1, wherein at least one of the cost values is calculated using the following equation $$\text{Cost} = c_1 + c_2 FAR_1 + c_3 \prod_{i=1}^{2} FAR_i + \ldots + c_{N+1} \prod_{i=1}^{N} FAR_i.$$

6. The method of claim 1, wherein the ACV range is provided by an administrator.

7. A computer readable memory device having stored thereon instructions that are executable by a computer to cause the computer to:

enroll at least two biometric specimens, a first one of the specimens being a first type, and a second one of the specimens being a second type;

determine a false acceptance ratio ("FAR") for each of the specimens, wherein the instructions cause the computer to determine at least one of the false acceptance ratios using the following equation $$FAR = P_{Type\,I} = P(x \in R_{Au} | \mathrm{Im}) = \int_{R_{Au}} f(x | \mathrm{Im}) dx;$$

identify authorization options, each option requiring a match to one or more of the biometric specimens;

calculate a cost value for at least one of the options to provide a calculated cost value ("CCV"), wherein the CCV is a function of the FAR(s) of the specimen(s) corresponding to the option;

identify an acceptable cost value range ("ACV range");

compare the CCV to the ACV range;

determine whether the CCV is in the ACV range;

select the option if the CCV is in the ACV range;

provide a set of biometric sample(s) (the "sample set"), the sample set having biometric sample(s) of the same type(s) as those corresponding to the selected option;

compare the biometric sample(s) to the biometric specimen(s);

determine whether the biometric sample(s) match the biometric specimen(s); and if the biometric sample(s) match the biometric specimen(s), then authorize the transaction.

8. The memory device of claim 7, wherein the instructions cause the computer to calculate at least one of the cost values using the following equation $$\mathrm{Cost} = c_1 + c_2 FAR_1 + c_3 \prod_{i=1}^{2} FAR_i + \ldots + c_{N+1} \prod_{i=1}^{N} FAR_i.$$

9. An authorization system, comprising:

a computer capable of executing computer-readable instructions;

at least one biometric specimen reader in communication with the computer;

at least one biometric sample reader in communication with the computer;

a database;

computer-readable instructions provided to the computer for causing the computer to:

enroll in the database at least two biometric specimens via one or more of the biometric specimen readers, a first one of the specimens being a first type, and a second one of the specimens being a second type;

determine a false acceptance ratio ("FAR") for each of the specimens, wherein the instructions cause the computer to determine at least one of the false acceptance ratios using the following equation $$FAR = P_{Type\,I} = P(x \in R_{Au} | \mathrm{Im}) = \int_{R_{Au}} f(x | \mathrm{Im}) dx;$$

identify authorization options, each option requiring a match to one or more of the biometric specimens;

calculate a cost value for at least one of the options to provide a calculated cost value ("CCV"), wherein the CCV is a function of the FAR(s) of the specimen(s) corresponding to the option;

identify an acceptable cost value range ("ACV range");

compare the CCV to the ACV range;

determine whether the CCV is in the ACV range;

select the option if the CCV is in the ACV range;

provide a set of biometric sample(s) (the "sample set") via one or more of the biometric sample readers, the sample set having biometric sample(s) of the same type(s) as those corresponding to the selected option;

compare the biometric sample(s) to the biometric specimen(s);

determine whether the biometric sample(s) match the biometric specimen(s); and if the biometric sample(s) match the biometric specimen(s), then authorize the transaction.

10. The system of claim 9, wherein the instructions cause the computer to calculate at least one of the cost values using the following equation $$\mathrm{Cost} = c_1 + c_2 FAR_1 + c_3 \prod_{i=1}^{2} FAR_i + \ldots + c_{N+1} \prod_{i=1}^{N} FAR_i.$$

11. A method of authorizing a transaction, comprising:

enrolling at least two biometric specimens, a first one of the specimens being a first type, and a second one of the specimens being a second type, wherein the biometric specimens comprise a set;

determining a false acceptance ratio ("FAR") for each of the specimens;

identifying authorization options, each option requiring a match to one or more of the biometric specimens, wherein the options comprise permutations of the set of biometric specimens;

calculating a cost value for at least one of the options to provide a calculated cost value ("CCV"), wherein the CCV is a function of the FAR(s) of the specimen(s) corresponding to the option;

identifying an acceptable cost value range ("ACV range");

comparing the CCV to the ACV range;

determining whether the CCV is in the ACV range;

selecting the option if the CCV is in the ACV range;

providing a set of biometric sample(s) (the "sample set"), the sample set having biometric sample(s) of the same type(s) as those corresponding to the selected option;

comparing the biometric sample(s) to the biometric specimen(s);

determining whether the biometric sample(s) match the biometric specimen(s); and if the biometric sample(s) match the biometric specimen(s), then authorizing the transaction.

12. The method of claim 11, wherein the types are selected from fingerprint, facial image, retinal image, iris scan, hand geometry scan, voice print, signature, signature gait, keystroke tempo, blood vessel pattern, palm print, skin composition spectrum, lip shape and ear shape.

13. The method of claim 11, wherein a first type corresponds to a first body part and a second type corresponds to a second body part.

14. The method of claim 11, wherein at least one of the false acceptance ratios is determined using the following equation $$FAR = P_{Type\,I} = P(x \in R_{Au} \mid \text{Im}) = \int_{R_{Au}} f(x \mid \text{Im})\,dx.$$

15. The method of claim 11, wherein at least one of the cost values is calculated using the following equation $$\text{Cost} = c_1 + c_2 FAR_1 + c_3 \prod_{i=1}^{2} FAR_i + \ldots + c_{N+1} \prod_{i=1}^{N} FAR_i.$$

16. The method of claim 11, wherein the ACV range is provided by an administrator.

17. A method of authorizing a transaction, comprising:
enrolling at least two biometric specimens, a first one of the specimens being a first type, and a second one of the specimens being a second type;
determining a false acceptance ratio ("FAR") for each of the specimens;
identifying authorization options, each option requiring a match to one or more of the biometric specimens;
calculating a cost value for at least one of the options to provide a calculated cost value ("CCV"), wherein the CCV is a function of the FAR(s) of the specimen(s) corresponding to the option, and at least one of the cost values is calculated using the following equation $$\text{Cost} = c_1 + c_2 FAR_1 + c_3 \prod_{i=1}^{2} FAR_i + \ldots + c_{N+1} \prod_{i=1}^{N} FAR_i;$$

identifying an acceptable cost value range ("ACV range");
comparing the CCV to the ACV range;
determining whether the CCV is in the ACV range;
selecting the option if the CCV is in the ACV range;
providing a set of biometric sample(s) (the "sample set"), the sample set having biometric sample(s) of the same type(s) as those corresponding to the selected option;
comparing the biometric sample(s) to the biometric specimen(s);
determining whether the biometric sample(s) match the biometric specimen(s); and
if the biometric sample(s) match the biometric specimen(s), then authorizing the transaction.

18. The method of claim 17, wherein the types are selected from fingerprint, facial image, retinal image, iris scan, hand geometry scan, voice print, signature, signature gait, keystroke tempo, blood vessel pattern, palm print, skin composition spectrum, lip shape and ear shape.

19. The method of claim 17, wherein a first type corresponds to a first body part and a second type corresponds to a second body part.

20. The method of claim 17, wherein at least one of the false acceptance ratios is determined using the following equation $$FAR = P_{Type\,I} = P(x \in R_{Au} \mid \text{Im}) = \int_{R_{Au}} f(x \mid \text{Im})\,dx.$$

21. The method of claim 17, wherein the biometric specimens comprise a set, and the options comprise permutations of the set.

22. The method of claim 17, wherein the ACV range is provided by an administrator.

23. A computer readable memory device having stored thereon instructions that are executable by a computer to cause the computer to:
enroll at least two biometric specimens, a first one of the specimens being a first type, and a second one of the specimens being a second type;
determine a false acceptance ratio ("FAR") for each of the specimens;
identify authorization options, each option requiring a match to one or more of the biometric specimens;
calculate a cost value for at least one of the options to provide a calculated cost value ("CCV"), wherein the CCV is a function of the FAR(s) of the specimen(s) corresponding to the option, and the instructions cause the computer to calculate at least one of the cost values using the following equation $$\text{Cost} = c_1 + c_2 FAR_1 + c_3 \prod_{i=1}^{2} FAR_i + \ldots + c_{N+1} \prod_{i=1}^{N} FAR_i;$$

identify an acceptable cost value range ("ACV range");
compare the CCV to the ACV range;
determine whether the CCV is in the ACV range;
select the option if the CCV is in the ACV range;
provide a set of biometric sample(s) (the "sample set"), the sample set having biometric sample(s) of the same type(s) as those corresponding to the selected option;
compare the biometric sample(s) to the biometric specimen(s);
determine whether the biometric sample(s) match the biometric specimen(s); and
if the biometric sample(s) match the biometric specimen(s), then authorize the transaction.

24. The memory device of claim 23, wherein the instructions cause the computer to determine at least one of the false acceptance ratios using the following equation $$FAR = P_{Type\,I} = P(x \in R_{Au} \mid \text{Im}) = \int_{R_{Au}} f(x \mid \text{Im})\,dx.$$

25. An authorization system, comprising:
a computer capable of executing computer-readable instructions;
at least one biometric specimen reader in communication with the computer;
at least one biometric sample reader in communication with the computer;
a database;
computer-readable instructions provided to the computer for causing the computer to:
enroll in the database at least two biometric specimens via one or more of the biometric specimen readers, a first one of the specimens being a first type, and a second one of the specimens being a second type;
determine a false acceptance ratio ("FAR") for each of the specimens;
identify authorization options, each option requiring a match to one or more of the biometric specimens;

calculate a cost value for at least one of the options to provide a calculated cost value ("CCV"), wherein the CCV is a function of the FAR(s) of the specimen(s) corresponding to the option, and the instructions cause the computer to calculate at least one of the cost values using the following equation $$\text{Cost} = c_1 + c_2 FAR_1 + c_3 \prod_{i=1}^{2} FAR_i + \ldots + c_{N+1} \prod_{i=1}^{N} FAR_i;$$

identify an acceptable cost value range ("ACV range");
compare the CCV to the ACV range;
determine whether the CCV is in the ACV range;
select the option if the CCV is in the ACV range;
provide a set of biometric sample(s) (the "sample set") via one or more of the biometric sample readers, the sample set having biometric sample(s) of the same type(s) as those corresponding to the selected option;
compare the biometric sample(s) to the biometric specimen(s);
determine whether the biometric sample(s) match the biometric specimen(s); and
if the biometric sample(s) match the biometric specimen(s), then authorize the transaction.

26. The system of claim 25, wherein the instructions cause the computer to determine at least one of the false acceptance ratios using the following equation $$FAR = P_{Type\,I} = P(x \in R_{Au} \mid \text{Im}) = \int_{R_{Au}} f(x \mid \text{Im})\, dx.$$

* * * * *